US009582963B2

(12) United States Patent
Johnson

(10) Patent No.: US 9,582,963 B2
(45) Date of Patent: Feb. 28, 2017

(54) METHOD AND SYSTEM FOR GAMING MACHINE ACCOUNTING

(71) Applicant: Tipping Point Group, LLC, Las Vegas, NV (US)

(72) Inventor: Sam Johnson, Las Vegas, NV (US)

(73) Assignee: Tipping Point Group, LLC, Las Vegas, NV (US)

( * ) Notice: Subject to any disclaimer, the term of this patent is extended or adjusted under 35 U.S.C. 154(b) by 442 days.

(21) Appl. No.: 14/148,805

(22) Filed: Jan. 7, 2014

(65) Prior Publication Data

US 2014/0121006 A1 May 1, 2014

Related U.S. Application Data

(63) Continuation-in-part of application No. 11/897,533, filed on Aug. 30, 2007, now Pat. No. 8,721,449, which (Continued)

(51) Int. Cl.
*G06F 17/00* (2006.01)
*G06F 19/00* (2011.01)
(Continued)

(52) U.S. Cl.
CPC ........... *G07F 17/3244* (2013.01); *G07F 17/32* (2013.01); *G07F 17/3202* (2013.01);
(Continued)

(58) Field of Classification Search
CPC .............. G07F 17/3202; G07F 17/3223; G07F 17/3225; G07F 17/3239; G07F 17/42
See application file for complete search history.

(56) References Cited

U.S. PATENT DOCUMENTS 4,004,097 A 1/1977 Spaulding
4,261,012 A 4/1981 Maloomian
(Continued)

FOREIGN PATENT DOCUMENTS

EP 0946028 9/1999
WO 02/55163 7/2002
(Continued)

OTHER PUBLICATIONS

Jon Lafayette, Adds on VOD as Seen as Counter to Skipping, tvweek.com, www.tvweek.com/article.cms?articleID=26175, Oct. 4, 2004.

(Continued)

*Primary Examiner* — Steven J Hylinski
(74) *Attorney, Agent, or Firm* — Weide & Miller, Ltd.

(57) ABSTRACT

A gaming machine has a main or master gaming controller. Primary gaming machine accounting is performed by the master gaming controller in communication with a casino accounting system. A secondary controller is associated with the gaming machine. The secondary controller facilitates paragame activity. Secondary gaming machine accounting, such as associated with activities implemented by the secondary controller, is performed by the secondary controller in communication with a secondary accounting system. The secondary controller and secondary accounting system can also mirror or monitor primary gaming machine accounting.

17 Claims, 8 Drawing Sheets

Related U.S. Application Data is a continuation-in-part of application No. 11/686,755, filed on Mar. 15, 2007, which is a continuation-in-part of application No. 11/468,946, filed on Aug. 31, 2006, which is a continuation-in-part of application No. 10/689,407, filed on Oct. 20, 2003, now Pat. No. 7,335,106.

(51) Int. Cl.
*G07F 17/32* (2006.01)
*G07F 17/42* (2006.01)

(52) U.S. Cl.
CPC ...... *G07F 17/3223* (2013.01); *G07F 17/3225* (2013.01); *G07F 17/3234* (2013.01); *G07F 17/3239* (2013.01); *G07F 17/3248* (2013.01); *G07F 17/3255* (2013.01); *G07F 17/42* (2013.01)

(56) References Cited

U.S. PATENT DOCUMENTS 4,357,624 A 11/1982 Greenberg
4,503,429 A 3/1985 Schreiber
4,521,014 A 6/1985 Sitrick
4,527,798 A 7/1985 Siekierski et al.
4,694,490 A 9/1987 Harvey et al.
4,704,725 A 11/1987 Harvey et al.
4,710,873 A 12/1987 Breslow et al.
4,743,022 A 5/1988 Wood
4,926,327 A 5/1990 Sidley
4,965,825 A 10/1990 Harvey et al.
5,105,184 A 4/1992 Pirani et al.
5,121,477 A 6/1992 Koopmans et al.
5,233,423 A 8/1993 Jernigan et al.
5,429,361 A 7/1995 Raven et al.
5,470,079 A 11/1995 LeStrange et al.
5,477,952 A 12/1995 Castellano et al.
5,531,441 A 7/1996 Dabrowski et al.
5,553,864 A 9/1996 Sitrick
5,559,312 A 9/1996 Lucero
5,586,936 A 12/1996 Bennett et al.
5,613,912 A 3/1997 Slater
5,655,961 A 8/1997 Acres et al.
5,678,679 A 10/1997 Berman
5,740,549 A 4/1998 Reilly et al.
5,761,647 A 6/1998 Boushy
5,774,873 A 6/1998 Berent et al.
5,785,592 A 7/1998 Jacobsen
5,813,912 A 9/1998 Shultz
5,816,918 A 10/1998 Kelly et al.
5,830,065 A 11/1998 Sitrick
5,887,243 A 3/1999 Harvey et al.
5,907,321 A 5/1999 Grossman et al.
5,919,090 A 7/1999 Mothwurf
5,941,772 A 8/1999 Paige
5,971,271 A 10/1999 Wynn et al.
5,990,927 A 11/1999 Hendricks et al.
6,003,013 A 12/1999 Boushy et al.
6,012,832 A 1/2000 Saunders et al.
6,015,344 A 1/2000 Kelly et al.
6,036,601 A 3/2000 Heckel
6,049,823 A 4/2000 Hwang
6,068,552 A 5/2000 Walker et al.
6,089,975 A 7/2000 Dunn
6,113,495 A 9/2000 Walker et al.
6,142,876 A 11/2000 Cumbers
6,175,358 B1 1/2001 Scott-Jackson et al.
6,186,893 B1 2/2001 Walker et al.
6,203,428 B1 3/2001 Giobbi et al.
6,234,900 B1 5/2001 Cumbers
6,244,957 B1 6/2001 Walker et al.
6,251,014 B1 6/2001 Stockdale et al.
6,253,119 B1 6/2001 Dabrowski
6,263,258 B1 7/2001 Dabrowski
6,280,318 B1 8/2001 Chris-Puszhiewicz
6,280,326 B1 8/2001 Saunders
6,302,793 B1 10/2001 Fertitta, III et al.
6,315,666 B1 11/2001 Mastera et al.
6,368,216 B1 4/2002 Hedrick et al.
6,375,567 B1 4/2002 Acres
6,379,246 B1 4/2002 Dabrowski
6,379,247 B1 4/2002 Walker et al.
6,390,917 B1 5/2002 Walker et al.
6,425,825 B1 7/2002 Sitrick
6,443,456 B1 9/2002 Gajor
6,459,440 B1 10/2002 Monnes et al.
6,460,848 B1 10/2002 Soltys et al.
6,500,067 B1 12/2002 Luciano et al.
6,503,147 B1 1/2003 Stockdale et al.
6,508,710 B1 1/2003 Paravia et al.
6,517,435 B2 2/2003 Soltys et al.
6,517,436 B2 2/2003 Soltys et al.
6,520,857 B2 2/2003 Soltys et al.
6,527,271 B2 3/2003 Soltys et al.
6,530,836 B2 3/2003 Soltys et al.
6,530,837 B2 3/2003 Soltys et al.
6,533,276 B2 3/2003 Soltys et al.
6,533,662 B2 3/2003 Soltys et al.
6,540,609 B1 4/2003 Paige
6,579,179 B2 6/2003 Poole et al.
6,579,180 B2 6/2003 Soltys et al.
6,579,181 B2 6/2003 Soltys et al.
6,582,310 B1 6/2003 Walker et al.
6,592,456 B2 7/2003 Walker et al.
6,595,857 B2 7/2003 Soltys et al.
6,598,788 B1 7/2003 Dabrowski
6,620,046 B2 9/2003 Rowe
6,638,163 B2 10/2003 Moody
6,641,483 B1 11/2003 Luciano
6,645,068 B1 11/2003 Kelly et al.
6,648,757 B1 11/2003 Slomiany et al.
6,652,378 B2 11/2003 Cannon et al.
6,652,380 B1 11/2003 Luciano
6,663,490 B2 12/2003 Soltys et al.
6,672,589 B1 1/2004 Lemke et al.
6,676,515 B1 1/2004 Baltz et al.
6,679,775 B1 1/2004 Luciano et al.
6,682,423 B2 1/2004 Brosnan et al.
6,685,559 B2 2/2004 Luciano et al.
6,712,696 B2 3/2004 Soltys et al.
6,712,698 B2 3/2004 Paulsen et al.
6,722,978 B2 4/2004 Valenti
6,729,956 B2 5/2004 Wolf et al.
6,743,095 B2 6/2004 Cole et al.
6,749,510 B2 6/2004 Giobbi
6,758,751 B2 7/2004 Soltys et al.
6,800,029 B2 10/2004 Rowe et al.
6,843,723 B2 1/2005 Joshi
6,848,995 B1 2/2005 Walker et al.
6,852,029 B2 2/2005 Baltz et al.
6,863,611 B1 3/2005 Morrow et al.
6,884,174 B2 4/2005 Lundy et al.
6,890,256 B2 5/2005 Walker et al.
6,896,618 B2 5/2005 Benoy et al.
6,908,384 B1 6/2005 Luciano, Jr.
6,916,246 B1 7/2005 Luciano, Jr.
6,924,903 B2 8/2005 Brooks et al.
6,935,946 B2 8/2005 Yoseloff
6,942,574 B1 9/2005 LeMay et al.
6,958,014 B1 10/2005 Luciano, Jr. et al.
6,984,174 B2 1/2006 Cannon et al.
6,991,543 B2 1/2006 Joshi
7,004,837 B1 2/2006 Crowder, Jr. et al.
7,022,017 B1 4/2006 Halbritter et al.
7,025,676 B2 4/2006 Cole et al.
7,063,617 B2 6/2006 Brosnan et al.
7,070,503 B2 7/2006 Rudolph
7,094,149 B2 8/2006 Walker et al.
7,112,138 B2 9/2006 Hedrick et al.
7,118,478 B2 10/2006 Fayter et al.
7,137,889 B1 11/2006 Luciano
7,137,892 B2 11/2006 Sitrick
7,241,219 B2 7/2007 Walker et al.

(56) References Cited

U.S. PATENT DOCUMENTS

| | | | | |
|---|---|---|---|---|
| 7,255,351 | B2 | 8/2007 | Yoseloff et al. | |
| 7,285,049 | B1 | 10/2007 | Luciano, Jr. et al. | |
| 7,290,072 | B2 | 10/2007 | Quraishi et al. | |
| 7,297,062 | B2 | 11/2007 | Gatto et al. | |
| 7,322,885 | B1 | 1/2008 | Luciano, Jr. et al. | |
| 7,335,106 | B2 | 2/2008 | Johnson | |
| 7,357,714 | B2 | 4/2008 | Tessmer et al. | |
| 7,392,470 | B2 | 6/2008 | Kammler | |
| 7,473,179 | B2 | 1/2009 | Xidos et al. | |
| 7,520,810 | B2 | 4/2009 | Dabrowski | |
| 7,674,177 | B2 | 3/2010 | Cole et al. | |
| 7,704,147 | B2 | 4/2010 | Quraishi et al. | |
| 7,771,271 | B2 | 8/2010 | Walker et al. | |
| 7,819,750 | B2 | 10/2010 | Lam et al. | |
| 7,827,488 | B2 | 11/2010 | Sitrick | |
| 7,867,086 | B2 | 1/2011 | Sitrick | |
| 8,133,102 | B2 | 3/2012 | Dabrowski | |
| 2002/0016202 | A1 | 2/2002 | Fertitta et al. | |
| 2002/0025850 | A1 | 2/2002 | Hafezi | |
| 2002/0128057 | A1 | 9/2002 | Walker et al. | |
| 2002/0142841 | A1 | 10/2002 | Boushy | |
| 2002/0147047 | A1 | 10/2002 | Letovsky et al. | |
| 2002/0155873 | A1 | 10/2002 | Berman et al. | |
| 2002/0155891 | A1 | 10/2002 | Okada et al. | |
| 2002/0165023 | A1* | 11/2002 | Brosnan | G07F 17/32 463/29 |
| 2002/0169021 | A1 | 11/2002 | Urie et al. | |
| 2002/0177479 | A1 | 11/2002 | Walker et al. | |
| 2002/0177480 | A1 | 11/2002 | Rowe | |
| 2002/0198044 | A1 | 12/2002 | Walker et al. | |
| 2003/0004871 | A1 | 1/2003 | Rowe | |
| 2003/0013512 | A1 | 1/2003 | Rowe | |
| 2003/0013513 | A1 | 1/2003 | Rowe | |
| 2003/0013516 | A1 | 1/2003 | Walker et al. | |
| 2003/0013527 | A1 | 1/2003 | Rowe et al. | |
| 2003/0027631 | A1 | 2/2003 | Hedrick et al. | |
| 2003/0032474 | A1 | 2/2003 | Kaminkow | |
| 2003/0036425 | A1 | 2/2003 | Kaminkow et al. | |
| 2003/0054868 | A1 | 3/2003 | Paulsen et al. | |
| 2003/0054880 | A1 | 3/2003 | Lam et al. | |
| 2003/0054881 | A1 | 3/2003 | Hedrick et al. | |
| 2003/0064800 | A1 | 4/2003 | Jackson et al. | |
| 2003/0083943 | A1 | 5/2003 | Adams et al. | |
| 2003/0096645 | A1 | 5/2003 | Soltys et al. | |
| 2003/0100359 | A1 | 5/2003 | Loose et al. | |
| 2003/0119579 | A1 | 6/2003 | Walker et al. | |
| 2003/0139214 | A1 | 7/2003 | Wolf et al. | |
| 2003/0148807 | A1* | 8/2003 | Acres | G07F 17/32 463/26 |
| 2003/0149619 | A1 | 8/2003 | Stanley et al. | |
| 2003/0162588 | A1 | 8/2003 | Brosnan et al. | |
| 2003/0176213 | A1* | 9/2003 | LeMay | G07F 17/32 463/20 |
| 2003/0187736 | A1 | 10/2003 | Teague et al. | |
| 2003/0195036 | A1 | 10/2003 | Poole et al. | |
| 2003/0207711 | A1 | 11/2003 | Rowe | |
| 2003/0216169 | A1 | 11/2003 | Walker et al. | |
| 2003/0216966 | A1 | 11/2003 | Saenz et al. | |
| 2003/0232647 | A1 | 12/2003 | Moser | |
| 2004/0024608 | A1 | 2/2004 | Saenz et al. | |
| 2004/0032086 | A1 | 2/2004 | Barragan | |
| 2004/0038735 | A1 | 2/2004 | Steil | |
| 2004/0039679 | A1 | 2/2004 | Norton et al. | |
| 2004/0039695 | A1 | 2/2004 | Rowe | |
| 2004/0043814 | A1 | 3/2004 | Angell et al. | |
| 2004/0053663 | A1 | 3/2004 | Paulsen | |
| 2004/0077408 | A1 | 4/2004 | D'Amico et al. | |
| 2004/0092303 | A1 | 5/2004 | George et al. | |
| 2004/0092315 | A1 | 5/2004 | Boyd et al. | |
| 2004/0106449 | A1 | 6/2004 | Walker et al. | |
| 2004/0113360 | A1 | 6/2004 | George et al. | |
| 2004/0127284 | A1 | 7/2004 | Walker et al. | |
| 2004/0132531 | A1 | 7/2004 | George et al. | |
| 2004/0132532 | A1 | 7/2004 | Brosnan et al. | |
| 2004/0142739 | A1 | 7/2004 | Loose et al. | |
| 2004/0143496 | A1 | 7/2004 | Saenz | |
| 2004/0209674 | A1 | 10/2004 | Conover et al. | |
| 2004/0214622 | A1 | 10/2004 | Atkinson | |
| 2004/0219975 | A1 | 11/2004 | Soltys et al. | |
| 2004/0254006 | A1 | 12/2004 | Lam et al. | |
| 2004/0254009 | A1 | 12/2004 | D'Amico et al. | |
| 2004/0254013 | A1 | 12/2004 | Quraishi et al. | |
| 2004/0254014 | A1 | 12/2004 | Quraishi et al. | |
| 2005/0003890 | A1 | 1/2005 | Hedrick et al. | |
| 2005/0009600 | A1 | 1/2005 | Rowe et al. | |
| 2005/0013527 | A1 | 1/2005 | Doyle et al. | |
| 2005/0014558 | A1 | 1/2005 | Estey | |
| 2005/0027381 | A1 | 2/2005 | George et al. | |
| 2005/0032575 | A1 | 2/2005 | Goforth et al. | |
| 2005/0037837 | A1 | 2/2005 | Rowe | |
| 2005/0054439 | A1 | 3/2005 | Rowe et al. | |
| 2005/0054446 | A1 | 3/2005 | Kammler et al. | |
| 2005/0059457 | A1 | 3/2005 | Rothschild et al. | |
| 2005/0059480 | A1 | 3/2005 | Soukup et al. | |
| 2005/0059485 | A1 | 3/2005 | Paulsen et al. | |
| 2005/0075165 | A1 | 4/2005 | George et al. | |
| 2005/0075889 | A1 | 4/2005 | Gomes et al. | |
| 2005/0085300 | A1 | 4/2005 | Johnson | |
| 2005/0096112 | A1 | 5/2005 | Guinn, Jr. et al. | |
| 2005/0096129 | A1 | 5/2005 | Walker et al. | |
| 2005/0119044 | A1 | 6/2005 | Lim et al. | |
| 2005/0119048 | A1 | 6/2005 | Soltys et al. | |
| 2005/0119052 | A1 | 6/2005 | Russell et al. | |
| 2005/0137011 | A1 | 6/2005 | Walker et al. | |
| 2005/0143166 | A1 | 6/2005 | Walker et al. | |
| 2005/0153768 | A1 | 7/2005 | Paulsen | |
| 2005/0153773 | A1 | 7/2005 | Nguyen et al. | |
| 2005/0170883 | A1 | 8/2005 | Muskin | |
| 2005/0170892 | A1 | 8/2005 | Atkinson | |
| 2005/0171808 | A1 | 8/2005 | Saenz et al. | |
| 2005/0182647 | A1 | 8/2005 | Saenz et al. | |
| 2005/0187012 | A1 | 8/2005 | Walker et al. | |
| 2005/0197183 | A1 | 9/2005 | Walker et al. | |
| 2005/0215310 | A1 | 9/2005 | Boyd et al. | |
| 2005/0215316 | A1 | 9/2005 | Rowe et al. | |
| 2006/0019747 | A1 | 1/2006 | Loose et al. | |
| 2006/0025206 | A1 | 2/2006 | Walker et al. | |
| 2006/0046819 | A1 | 3/2006 | Nguyen et al. | |
| 2006/0068906 | A1 | 3/2006 | Morrow et al. | |
| 2006/0073870 | A1 | 4/2006 | Cannon | |
| 2006/0084488 | A1 | 4/2006 | Kinsley et al. | |
| 2006/0135230 | A1 | 6/2006 | Godse et al. | |
| 2006/0135255 | A1 | 6/2006 | Roth | |
| 2006/0154719 | A1 | 7/2006 | Okuniewicz | |
| 2006/0154721 | A1 | 7/2006 | Okuniewicz | |
| 2006/0178208 | A1 | 8/2006 | Cole | |
| 2006/0211477 | A1 | 9/2006 | Walker et al. | |
| 2006/0247027 | A1 | 11/2006 | Walker et al. | |
| 2006/0252504 | A1 | 11/2006 | Walker et al. | |
| 2006/0252505 | A1 | 11/2006 | Walker et al. | |
| 2006/0287063 | A1 | 12/2006 | Walker et al. | |
| 2007/0004519 | A1 | 1/2007 | Swart et al. | |
| 2007/0015569 | A1 | 1/2007 | Norton et al. | |
| 2007/0046991 | A1* | 3/2007 | Ohara | G03G 15/5087 358/1.15 |
| 2007/0077997 | A1 | 4/2007 | Johnson | |
| 2007/0105617 | A1 | 5/2007 | Walker et al. | |
| 2007/0121936 | A1 | 5/2007 | Guillou et al. | |
| 2007/0129137 | A1 | 6/2007 | Walker et al. | |
| 2007/0155469 | A1 | 7/2007 | Johnson | |
| 2007/0213124 | A1 | 9/2007 | Walker et al. | |
| 2007/0243928 | A1* | 10/2007 | Iddings | G07F 17/32 463/26 |
| 2007/0259709 | A1 | 11/2007 | Kelly et al. | |
| 2007/0265060 | A1 | 11/2007 | Hornik et al. | |
| 2008/0009344 | A1 | 1/2008 | Graham et al. | |
| 2008/0026816 | A1 | 1/2008 | Sammon et al. | |
| 2008/0039190 | A1 | 2/2008 | Walker et al. | |
| 2008/0113773 | A1 | 5/2008 | Johnson | |
| 2008/0113802 | A1 | 5/2008 | Johnson et al. | |
| 2008/0119253 | A1 | 5/2008 | Ryan et al. | |
| 2008/0161107 | A1 | 7/2008 | Johnson | |
| 2009/0233705 | A1* | 9/2009 | LeMay | G07F 17/32 463/25 |

(56) References Cited

U.S. PATENT DOCUMENTS

| | | | | |
|---|---|---|---|---|
| 2009/0291736 | A1 | 11/2009 | Walker et al. | |
| 2010/0167822 | A1* | 7/2010 | Crumby | G07F 17/3202 463/42 |
| 2012/0329549 | A1 | 12/2012 | Johnson | |

FOREIGN PATENT DOCUMENTS

| | | |
|---|---|---|
| WO | 03/089082 | 10/2003 |
| WO | 03/093986 | 11/2003 |
| WO | 2005/070509 | 8/2005 |
| WO | 2005/099839 | 10/2005 |

OTHER PUBLICATIONS

James R. Hagarty, Judge's Ruling on Pop-Up Ads is a Blow to Web-Site Operators, Wall Street Journal, Monday, Sep. 8, 2003, p. A3 and A5.

Michael McCarthy, Ads are here, there everywhere, USA Today, Jun. 19, 2001.

Terry Lefton, Playing the Ad Market, The Industry Standard, Jul. 30, 2001.

Daisy Whitney, A 'TiVo-Proof' Ad Model, Vision Week, May 7, 2004.

Curt Rist, Should your ad go here?, http://money.cnn.com/2004103/04/technology/buisness2_adds/.

Jack Myers, Outdoors Sets Sites on Doubling Share-of-Market with research & Tech Upgrades, Jack Myers Report, Mar. 3, 2004.

* cited by examiner

METHOD AND SYSTEM FOR GAMING MACHINE ACCOUNTING

RELATED APPLICATION DATA

The present invention is a continuation-in-part of U.S. application Ser. No. 11/897,533, filed Aug. 30, 2007, which is a continuation-in-part of U.S. patent application Ser. No. 11/686,755, filed Mar. 15, 2007, which is a continuation-in-part of U.S. patent application Ser. No. 11/468,946, filed on Aug. 31, 2006, which is a continuation-in-part of U.S. patent application Ser. No. 10/689,407, filed on Oct. 20, 2003.

FIELD OF THE INVENTION

The present invention relates to accounting systems and methods for gaming machines.

BACKGROUND OF THE INVENTION

Existing electronically controlled gaming machines are connected to casino accounting systems. These systems allow the casinos to monitor activities at each gaming machine. For example, the amount of money a player associates with a gaming machine, the amount of the player's wagers (such as in credits) and the amount of winnings paid to the player, may be tracked.

These systems, however, only work with gaming machines in their native configuration. A casino may wish to alter the configuration of an existing gaming machine to include other features. In such instances, the traditional accounting features may no longer be supported.

SUMMARY OF THE INVENTION

One aspect of the invention present invention advantageously provides the ability for paragaming activity to be parasitically provided on an electronic gaming machine. In one embodiment of the invention, a cashout event is detected by a controller unit. The controller unit may detect the cashout event by receiving a cashout command over a SAS port or by detecting printer commands commensurate with a cashout event over a printer port, or both. The controller unit effectively operates to prevent the cashout event from printing a cash voucher and instead, offers to the customer the opportunity to participate in a paragaming activity. If the customer declines, the cashout event is concluded and a voucher is printed. However, if the customer accepts the offer, the controller unit parses the printer commands to identify a validation number and causes a "voucher in" event to occur via a validation/redemption server (referred to herein as a VRED™ server). If the balance from the redeemed voucher is sufficient, then the controller unit deducts the fee associated with the paragaming event from the balance. In addition, certain paragaming events may also include payout tables and provide winnings. If the paragaming activity results in a winning event similar actions can be taken to add the winnings to the existing balance. Alternatively, other SAS or standard commands may be used to implement the payout aspect of the paragaming event. This allows the accounting system to keep a record of the event. A unique ID is associated with the transaction to facilitate tracking and reporting. The controller unit then prints a transaction receipt and a cash voucher.

Another aspect of the present invention is to move funds from the controller unit onto the EGM instead of printing out a cash voucher. This aspect of the invention is realized by placing the controller unit between the EGM and the bill acceptor and communicating to the bill acceptor through its interface—typically a serial port. Advantageously, this aspect of the present invention not only enables the transfer of funds from the controller unit to the EGM, but it also enables a variety of other features to the bill acceptor. For instance, the controller unit can temporarily turn the EGM into an ATM, allow the customer to extract funds through the ATM to be loaded into the controller unit, and then transfer these funds via ATM transfer using a card reader interface with the controller unit. The card reader is also connected to controller unit so that the controller unit can read cards and can do further actions for cards that the EGM would normally reject.

Another aspect of the invention is a gaming machine accounting system and methods for accounting. In one embodiment, a gaming machine has a master gaming controller which implements base or primary game activity. Primary gaming machine accounting is implemented via the master gaming controller in communication with a casino accounting system. This activity may include the tracking of monies received at the gaming machine, credits assigned to the player, credits awarded to the player and credits paid to the player.

The gaming machine also has a secondary controller. The secondary controller is configured to present secondary functionality, such as paragame activity, at the gaming machine. Preferably, the secondary controller is "interposed" at an existing gaming machine relative to communication links between the master gaming controller and one or more peripherals.

Secondary gaming machine accounting is implemented via the secondary controller in communication with a secondary accounting system. This activity may include the tracking of secondary credits. The secondary accounting system may also be used to track primary gaming machine accounting.

In one embodiment, the secondary controller may be used to monitor primary gaming machine activity, including primary gaming machine accounting data, such as monies accepted, tickets accepted, primary credits wagered, primary credits won and primary credits paid out to the player (whether as cash or tickets). The secondary controller may facilitate allocations of accepted value (whether from a ticket/voucher, coins, currency, credit card or the like) as either or both of primary or secondary credits. The secondary controller may facilitate transfers of primary to secondary credits or secondary credits to primary credits. The secondary controller may facilitate validation of primary tickets representing primary credits or secondary tickets representing either or both of primary or secondary credits.

In accordance with the accounting system, a gaming machine may be retrofit with a secondary controller so as to present secondary functionality. The accounting system can be used to track and reconcile all accounting-related activities at the gaming machine, including those implemented via the secondary controller, without having the secondary controller interface with the casino's accounting system.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention, as well as features and aspects thereof, is directed towards providing paragaming activities on existing electronic gaming machine platforms in a manner that allows for the collection of funds to engage the paragaming activity and/or providing monetary winnings to customers through controlling the bill acceptor, printer and/or the card reader elements of the EGM. One aspect of the present invention is a novel way to interface to the casino's accounting system without requiring customization of the paragaming system or altering of the existing accounting system. It should be understood that the various casinos may use different accounting systems to operate the electronic gaming machines. To build a paragaming device that interacts with the accounting systems would require the cooperation of the slot accounting software vendor to develop a software interface for the paragaming device. In general, a PLAYERVISION™ Controller Unit (PCU) is associated with a gaming machine, preferably interposed between a master controller thereof and one or more peripherals thereof. Preferably, the PCU is connected to one of the SAS ports available on a typical electronic gaming machine (most machines include at least two), to interrogate and obtain certain information and/or to control certain aspects of the electronic gaming machine. The other SAS port of the electronic gaming machine interfaces to a SMIB to enable communication with the casino accounting system. Similarly, in this aspect of the present invention, the PCUs interface to at least one server, such as a validation/redemption (VRED™) server over a network, such as an Ethernet connection. The server then interfaces to one or more SMIBs using the SAS protocol and as such, provides an interface to the slot accounting system. Turning now to the figures, various aspects, features and embodiments of the present invention are described in more detail.

Figure 1:
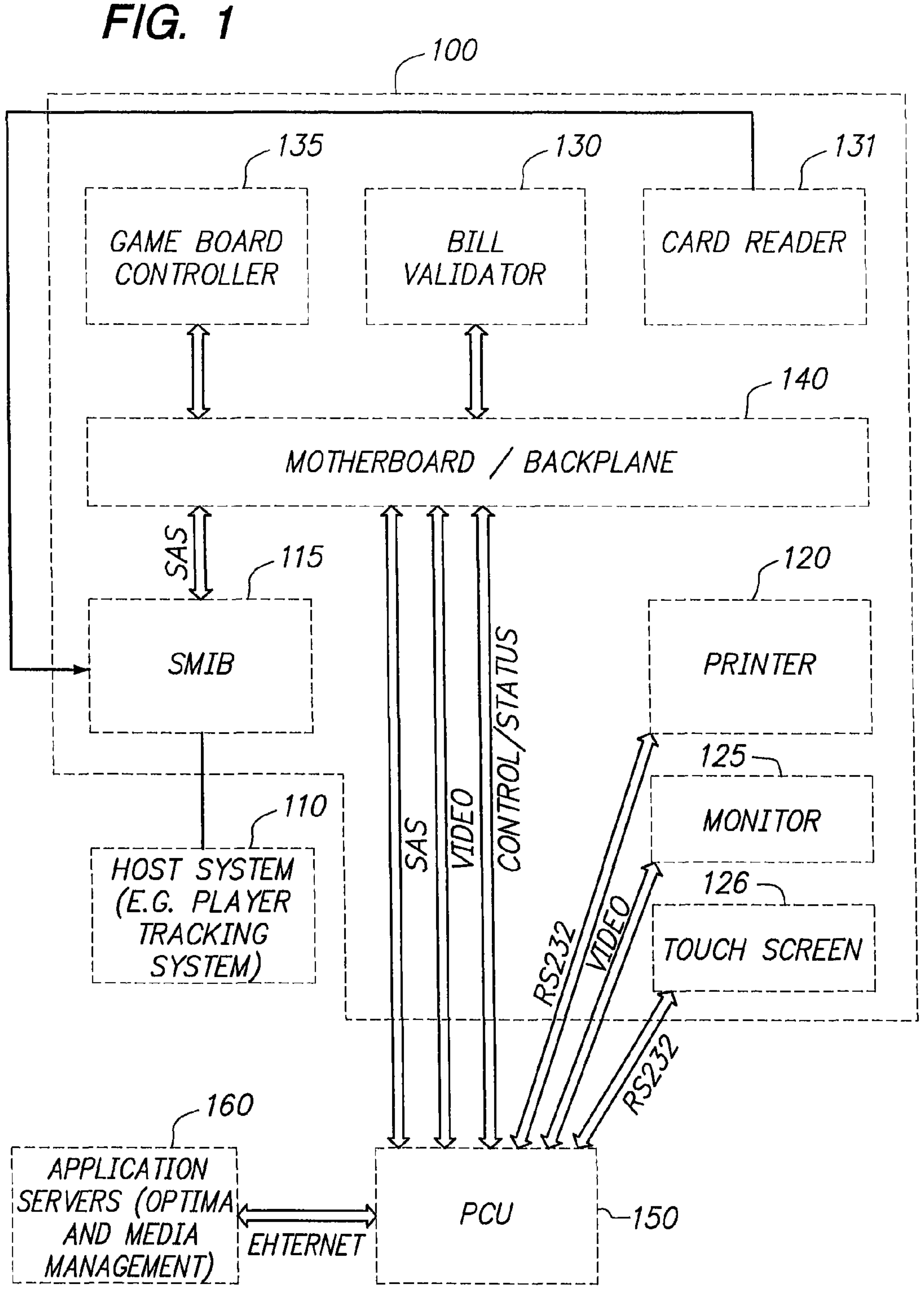
FIG. 1 is a block diagram illustrating a typical interface of a PCU to an existing gaming machine platform.

FIG. 1 is a block diagram illustrating a typical interface of a PCU to an existing gaming machine platform. Such an environment is suitable for various embodiments of the present invention although, it should be understood that the illustrated embodiment is only an example of a suitable environment and the present invention is not limited to operation within the illustrated environment. The environment includes an electronic gaming machine (EGM) 100 which is typically an approved and regulated machine. The EGM 100 is connected to a Host System 110 via a Slot Machine Interface Board (SMIB) 115, and includes a Printer 120, a Monitor or display 125 (such as an LCD, plasma, CRT, or other types of displays now known or later developed); a Bill Validator 130 and a Game Board or Master Gaming Controller 135, all interconnected through a motherboard or backplane 140. A PCU 150 interfaces to the EGM 100 and to an application server 160. The PCU 150 interfaces to the motherboard/backplane 140 using a SAS interface or protocol. The PCU 150 also interfaces to the printer 120, the Touchscreen 126, and the Monitor 125. The PCU 150 interfaces with the existing video and the Printer 120 of the EGM 100 (such as a slot machine), and adds an application suite of additional functionalities to the existing EGM 100. As detailed below, the PLAYERVISION™ controller unit and system is designed to enhance the functionality, entertainment value and revenue per machine beyond the machines current capabilities.

The PCU 150 in cooperation with the Application Servers 160 effectively converts existing slot machines into dual purpose slot machines/kiosks. One of the products that incorporate this invention, or aspects of this invention is referred to by the applicant as the PLAYERVISION™ system. The suite of applications, and the PCU 150 do not rely-on, or modify the EGM's 100 current functionality. Thus, the suite of applications is an extension and enhancement of the existing resources and video "real-estate" within the EGM 100.

For example, in one embodiment of the present invention, casino operators may be provided with the ability to:

1. Promote and sell a linked progressive Keno style game such as NEVADA NUMBERS® and THE MILLION DOLLAR TICKET® directly via an EGM 100 that is connected to an on-premise, application server 160 housing a game management system for the offered games. The EGM 100 functions as a ticket or keno writer station or kiosk in this particular application.
2. Display a customized marketing loop of video content when the EGM 100 is idle enabling the casino operator to more effectively promote and communicate to their customers on an EGM 100 that otherwise was not being fully utilized. Such a function can be turned on and/or off as defined by the casino operator (i.e., auto "on" after "X" minutes of game idle-time, and "off" with a screen-touch or after a specific number of minutes).
3. Present TV programming (audio and video) on the EGM 100 via the Monitor 125 (or portion thereof) with user selectable channels.

Other non-limiting examples of capabilities/features that could be providing in various embodiments of the present invention include:

1. Providing the ability to accept other wagers and transactions that otherwise would not have been possible through the EGM 100. An example of this additional wager is a race and sports wager. To implement such a feature or functionality, the EGM 100 acts as a kiosk terminal interfacing into existing, approved, gaming systems in operation at the casino.

2. Providing the ability to perform, configure and direct player specific marketing or paragaming activities to the player. In one embodiment, the PCU transmits player specific advertising or games, for example, as provided by one or more of the application servers. The application servers may configure the advertising or games for the player based upon identification information obtained remotely. In such an embodiment, for example, the application server(s) may communicate with one or more player tracking servers of the host gaming system so as to obtain player information.
3. Providing the purchase of a live Keno game and commerce/couponing capabilities.

The PCU 150 is connected to the video display or Monitor 125, the printer 120 and a SAS port of the motherboard/backplane 140 of the EGM 100, as well as the Application Servers 160 to provide the above-described functionality. In an exemplary embodiment, the Application Servers may include a Game Management system, a Media Management System, and/or a feed of media content, such as the game provider's local television network (i.e CATV). In one embodiment, the television or other video presentation is delivered to the EGM 100 via a coaxial cable; however, it will be appreciated that other delivery mechanisms are also anticipated including various wired, optical, networked, and wireless delivery techniques, as well as streaming server to PCU and other techniques.

To further give an appreciation of the application of the present invention, three distinct capabilities, features or aspects of an environment in which various embodiments of the present invention can operate are described. By understanding these capabilities/features, the advantages associated with embodiments of the present invention can be more appreciated.

As a non-limiting example of the operation of the present invention, the provision of a paragame referred to by the applicant as SLOTTOVISION, is described as being provided through an embodiment of the present invention. In providing this paragame, the PCU 150 makes use of the input mechanism of the EGM 100, such as the touch screen 126 of the EGM 100 if applicable, to serve as the interface to merchandise the paragame to the customer. Activity on the user interface is presented to the Game Management System residing in the Application Server 160. The Game Management System then performs standard procedures associated with writing a keno or other ticket. For example, a ticket for NEVADA NUMBERS® or a THE MILLION DOLLAR TICKET® can be provided as though written by an approved writer station connected to a Game Management System. Additionally the PCU 150 makes use of the existing printer 120 attached to the EGM 100 to produce a valid ticket receipt that contains all information required by Minimum Internal Control Standards. Beyond the normal approved validation and logging process typically provided by a writing station for a NEVADA NUMBERS® and THE MILLION DOLLAR TICKET® transaction, the PCU 150 also connects to the game provider's existing Slot Accounting System with its own unique asset number to properly account for transactions.

As another non-limiting example, embodiments of the present invention may provide a paragaming function referred to by the applicants as ADVISION. An example of ADVISION is the provision of advertising or other content to an otherwise un-utilized display device (such as a television in a restaurant or a video gaming machine, etc.) In providing this feature, the PCU 150 interfaces to the Monitor 125 of the EGM 100 display to present advertisements, information, messaging, and promotions to viewers in either a player-selected, or "screensaver" mode. This presentation can be completely "client-specific", or in other words, can be controlled by the display device operator (i.e., casino operator). The content can be still-frames, animations, full-motion videos or a combination of two or more of these. This feature can permit complete control over the content as to display times, campaign start/stop dates, display schedules, and background media management functionality. Both player-selected and screensaver modes are interrupted by a screen-touch, game initiation (game buttons), or cash-in events to restore the EGM 100 to the appropriate state. For example, the PCU could used to provide the home page for an EGM. Players then would have a choice of going to paragames or base game versus blending of the two up front.

Yet another non-limiting example of the operation of the present invention is the provision of what the applicant refers to as PLAYERVISION™ TV on an EGM incorporating the present invention. When this paragaming feature is enabled (i.e. when selected by the player or otherwise enabled) this embodiment of the invention presents audio and/or video from a tuned TV station or from some other video source. The player or viewer is able to control the content being viewed by changing or selecting a channel, adjusting the volume and/or disabling the viewing. The display can be positioned and/or re-sized by the player so that it doesn't interfere with underlying game they are playing. With coax feed, the full range of "in-house", client site channels are available, or the operator may restrict the viewable content to selected "band" of channels.

More specifically, the PCU can be an advanced multimedia device and in a general embodiment, can interconnect with multiple video sources, such as a CATV network, through a variety of video inputs and formats, multiple data sources through a variety of data lines and multiple application servers typically attached to a LAN via an Ethernet connection or wireless encrypted 802.11x standards. The sources, media types and channel choices available can be based on the player's profile. For some anticipated embodiments, although not necessarily required for all embodiments, the PCU connects to the EGM through one or more functional connections including:

(a) the video monitor or display 125
(b) the printer, such as the ticket-in/ticket-out printer 120
(c) the SAS port of the motherboard/backplane 140
(d) the touch screen 126
(e) the bill acceptor 130 and
(f) the card reader 131

The application servers provide the management of the specific application being performed on the EGM through the PCU. The application server 160 illustrated in FIG. 1 may include a Game Management System and/or a Media Management System. It should be appreciated that other applications may also be included. Video content, such as TV programming can be delivered to the PCU through a coax connection or through other interfaces, such as through a LAN or wireless network. Although the present invention can incorporate a variety of embodiments and interface to a variety of application servers, some of the typically anticipated applications are further described as a non-limiting example of the operation of the present invention.

In general, games such as keno games, lotteries, race and sports and progressive games have a Game Management System that can be interfaced to through a writer station to order and pay for participation tickets. In embodiments of the present invention, the Game Management Server enables the PCU to connect to a Game Management system as if it were a standard writer station on the network. As such, the PCU enables slot machines to deliver self-service transactions for a variety of games, such as NEVADA NUMBERS®, THE MILLION DOLLAR TICKET® or other such games. In one embodiment, the PCU interface uses a custom socket-based protocol over a TCP/IP network to send, receive and acknowledge messages regarding NEVADA NUMBERS®, THE MILLION DOLLAR TICKET® or other game receipts. For security, all messages can be encrypted and authenticated using AES 256 or other common encryption or encoding methods. The PCU, through the Game Management System, connects to a central system at each location the Game Management System for the NEVADA NUMBERS®, THE MILLION DOLLAR TICKET® or other game of interest that serve the games and that are housed at a physically secure location, and operates to validate and manage all transactions. The system utilizes real-time authentication and authorization and precludes tickets from being issued if there is no connectivity.

The Media Management (also referred to as the Media Management and Entertainment Server Application) enables the PCU to provide media and marketing content to the electronic gaming machines. Utilizing this aspect of the present invention, the owner or operator of the electronic gaming machines can more effectively market and promote to their customers. The Media Management application enables operators to schedule unique loops of content, whereby the content can be programmed to play for a specific duration of time (e.g. 30 seconds), during a specific period of time (e.g., from start date to end date), or for specific times, days and weeks (e.g., M, T and Th from 1:00 pm to 5:00 pm. In one embodiment, the PCU interface uses a custom socket-based protocol over a TCP/IP network to send, receive and acknowledge media content and playlist instructions.

Figure 2:
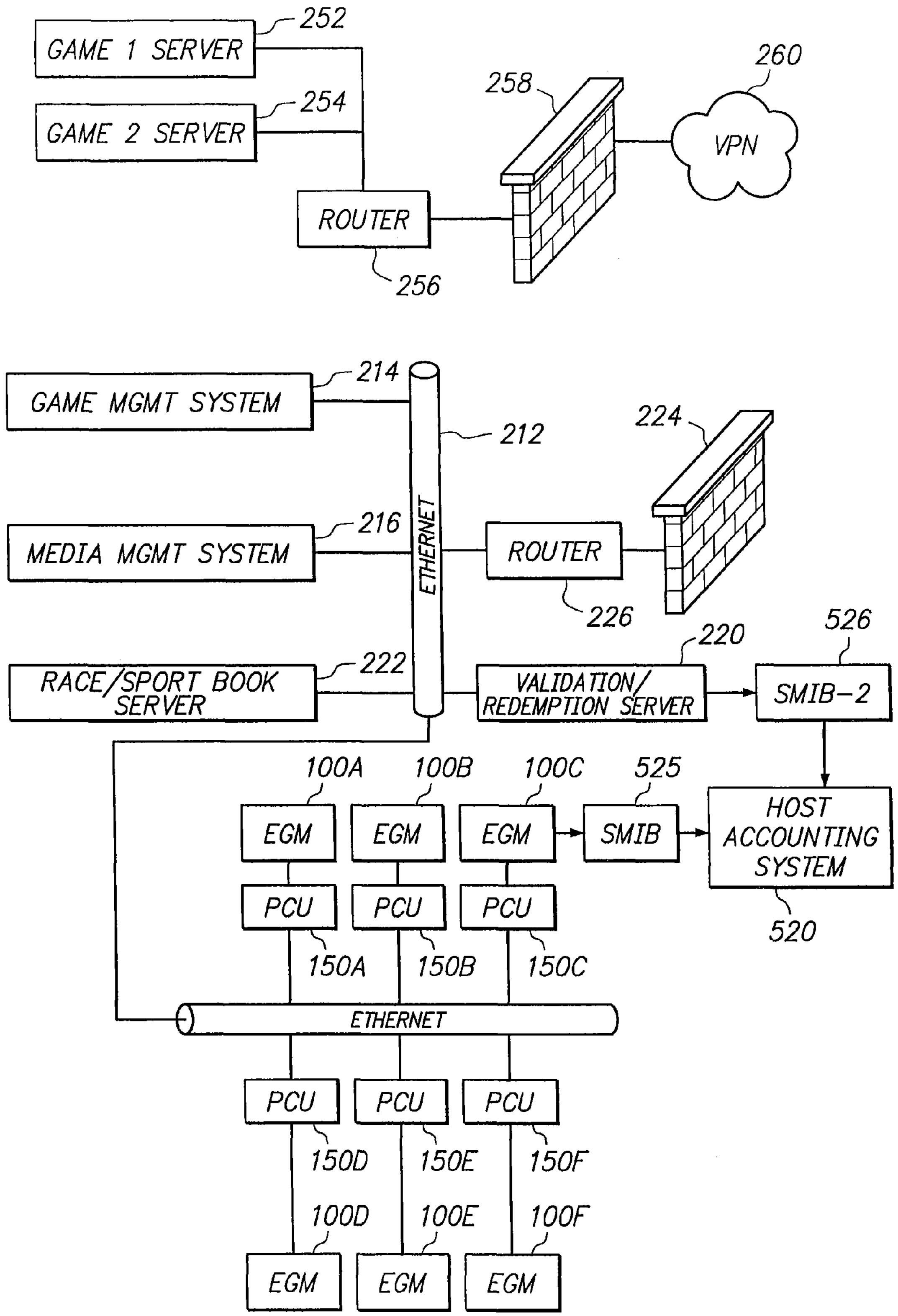
FIG. 2 is a system block diagram illustrating a typical environment that includes an embodiment of the present invention.

FIG. 2 is a system block diagram illustrating a typical environment that includes an embodiment of the present invention. The illustrated embodiment of the present invention comprises a network 212 including application servers such as a Game Management System 214, a Media Management System 216, a Validation/Redemption Server 220 and a Race/Sports Book Server 222. A bank of electronic gaming machines 100*a-f* is communicably coupled to the network 212, with one or more of the electronic gaming machines 100*a-f* being connected to a network through a PLAYERVISION™ Control Unit 150*a-f* respectively. Each electronic gaming machine and PLAYERVISION™ Control Unit pair typically resembles the configuration illustrated in FIG. 1.

The bank of electronic gaming machines is shown as being connected to the network through a CAT-5, CAT-6, a secure wireless connection or some other technique. The application servers are protected from external communication through a firewall 224 connected to a router 226. The Game Management System 214 connects to one or more game servers (two game servers 252 and 254 are illustrated in this exemplary embodiment) through a VPN 260 or other private network. In general, within a casino environment, servers are protected by industry-standard hardware or host-based firewalls to prevent unauthorized network traffic from affecting system components. In addition, in the illustrated embodiment, a firewall 258 is also placed between the frame relay and or VPN/dial-up connection that connects to the game servers. Communication with the game servers is routed through router 256 and can be conducted by HTTP/SSL over a VPN connection. Data may be encrypted and authenticated using industry-standard SSL communications over a VPN connection.

Figure 3:
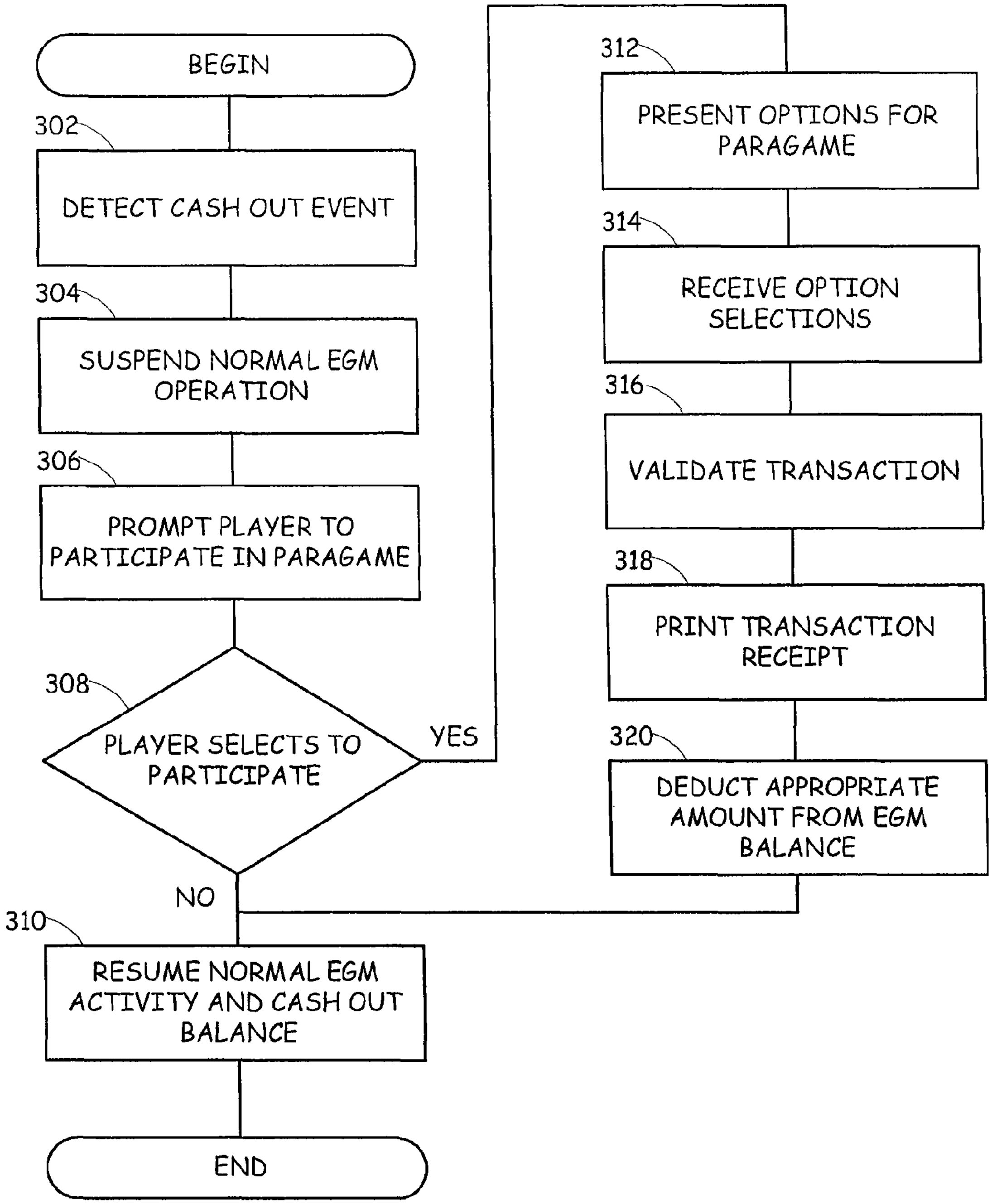
FIG. 3 is a flow diagram illustrating the steps involved in an exemplary embodiment of the present invention wherein a paragame is provided via a standard electronic gaming machine.

FIG. 3 is a flow diagram illustrating the steps involved in an exemplary embodiment of the present invention wherein a paragame is provided via a standard electronic gaming machine. In general, a PCU associated with an EGM detects the occurrence of a triggering event, such as a cashout event, and then proceeds to offer participation in a paragaming event to the customer. More specifically, in the illustrated embodiment, the PCU detects the occurrence of a cashout event 302. It should be noted that other events could be used to trigger the offer of paragaming participation and the cashout event is simply one, non-limiting example of an event. Other non-limiting examples may include adding additional money to the EGM, a threshold increase in the EGM balance due to one or more wins, a threshold period of time for playing, a threshold period of idle time, a random time-out, a periodic time-out, a player selecting an icon on the monitor, etc. Once a trigger event is detected, normal operation of the EGM is suspended 304. In the illustrated embodiment, the cashout process would be interrupted. The player or customer is then prompted or provided an offer to participate in a paragaming event 306. The offer and/or the available paragame(s) can be selected based on the user profile upon cash out. If the customer declines to participate in the paragaming event 308, the normal EGM activity is resumed. In the illustrated example, the normal operation would then proceed with a cashout of the current balance in the EGM by printing a cash voucher or other cashout vehicle 310.

However, if the player elects to participate in the paragaming event 308, the customer is presented with options pertaining to the paragaming event 312. This step can vary greatly depending on the particular embodiment of the invention. For instance, if the paragaming activity is a wide area progressive keno game, the customer may select the number of desired tickets and select the particular numbers for each ticket or have the Game Management System 214 select a quick pick option through the appropriate game server. In an advertising or couponing paragaming scenario, the customer may be presented with the option to purchase a meal voucher, purchase a product, etc. If the paragaming event is the provision of media content, the customer may be presented with the option to view the media for a select period of time or otherwise. In any event, the selected options are received 314 and the option selection process either ends automatically upon the last selection or proactively by the customer selecting a purchase button. At this point, the transaction is validated 316 and transaction receipt is printed 318. The cash balance in the EGM is reduced by the purchase or participation price 320. Normal operation of the EGM then resumes and, in the illustrated example, a cashout of the current balance in the EGM is performed by printing a cash voucher or other cashout vehicle 310.

In a more specific example, this embodiment of the invention may be utilized to provide a slot machine customer with the opportunity to participate in a paragame, such as NEVADA NUMBERS® upon the occurrence of a cashout event. When the cashout process is initiated, instead of the slot machine immediately producing a cash voucher, the PLAYERVISION™ platform temporarily suspends the slot machine, and prompts the player if they would like to purchase a chance at the upcoming NEVADA NUMBERS® drawing. If the player is not interested in making such a wager, then the normal cashout process takes place where a cash voucher for the funds is validated through the slot accounting system. If the player is interested in purchasing a NEVADA NUMBERS® ticket, then the customer is presented with the option to select their own numbers or have the Game Management System generate a quick pick ticket. Once the numbers are selected or the quick pick option is selected, the customer can proceed with the transaction by pressing the "Proceed With Purchase" button. Once the system receives the customer's acknowledgement the transaction is validated via LVGI's OPTIMA™ Game Management System a receipt is printed from the standard printer attached to the slot machine. The PLAYERVISION™ system then deducts the appropriate amount from the slot machine's account balance to cover the cost of the NEVADA NUMBERS® transaction. Lastly, the customer receives a cash voucher for the remaining balance.

Figure 4:
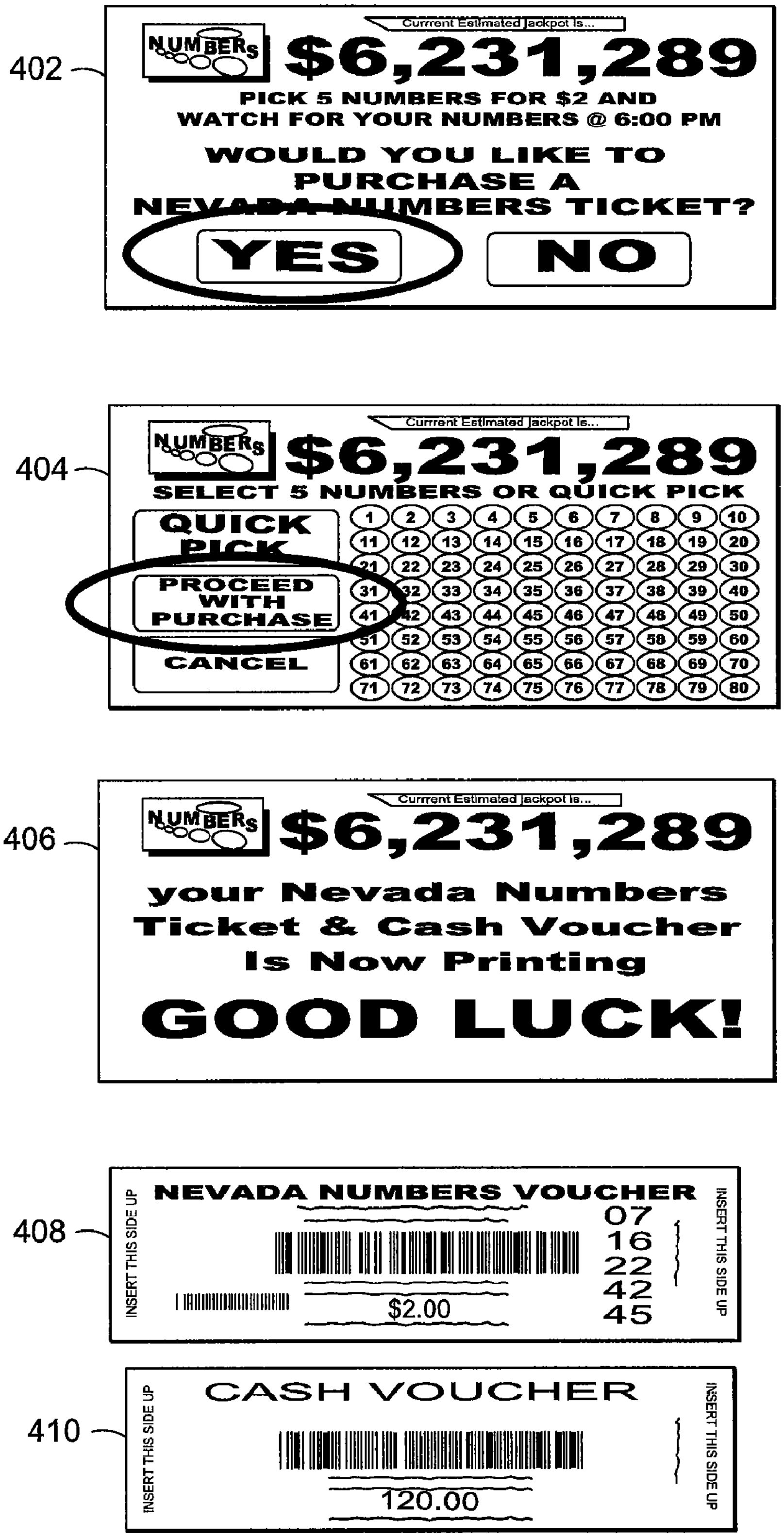
FIG. 4 is a screen/presentation flow of a specific embodiment of the invention as generally described in conjunction with FIG. 3.

FIG. 4 is a screen/presentation flow of a specific embodiment of the invention as generally described in conjunction with FIG. 3. Screen 402 is presented to the customer upon the detection or occurrence of the triggering event 302 (i.e., a request to cashout). Screen 402 provides current jackpot status information for the NEVADA NUMBERS® Keno game, presents the rules and cost to participate and then invites the customer to play 306. Screen 404 presents a user interface to entering options pertaining to the paragaming event 312. In this example, the options allow the customer to select five numbers from the available 80 numbers or to request a quick pick. Once the customer is completed 314, the customer can select the "proceed with purchase" button to continue or may cancel out of the transaction. If the customer selects to proceed with the purchase, screen 406 is presented to notify the customer that the transaction has been validated 316 and that the receipt/ticket 408 is being printed 318. Finally, the cash voucher 410, with a balance reduced by any fees associated with the purchase of the NEVADA NUMBERS® ticket 408, is also printed out for the customer as the normal operation of the EGM resumes 310.

One aspect of the present invention is to non-invasively provide the paragaming functionality in a parasitic manner by detecting the occurrence of a cashout event, temporarily taking over operation of the user interface of the EGM, providing the paragaming event to the customer and then conducting all accounting functions necessary to extract payment for the paragaming event participation. Each PCU connects to the Game Management System with a unique station ID. All transactions that occur, via the PLAYERVISION™ implementation, are tracked via the Game Management system in an identical manner in which regular Keno and NEVADA NUMBERS® tickets are written via a writer station. Additionally, each PCU connects to the casino's slot accounting system and is recognized/enrolled as a unique asset number in order to properly record validation and redemption requests made by the PCU.

Figure 5:
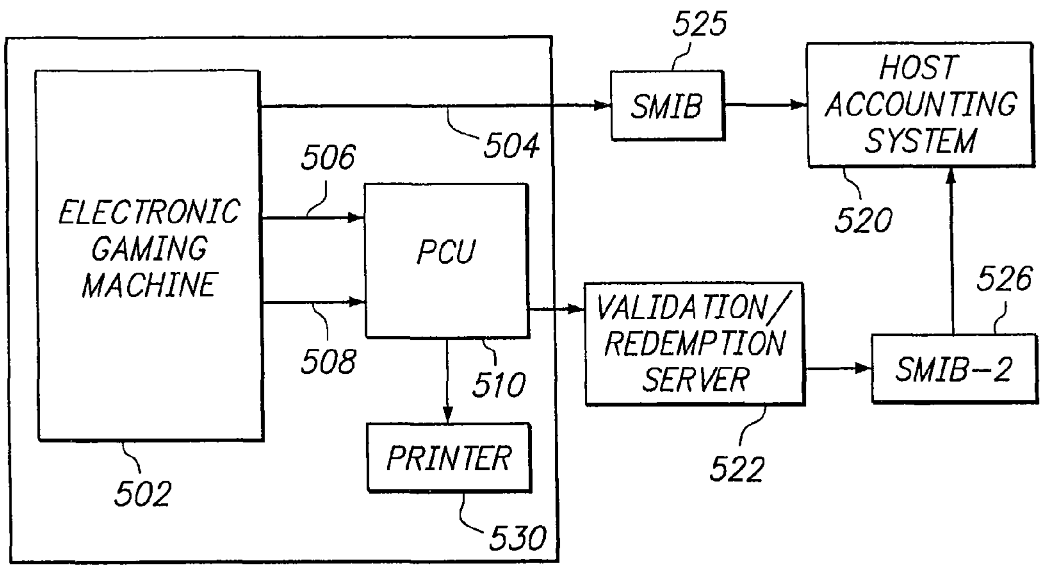
FIG. 5 is a block diagram showing the components involved in implementing an embodiment of the present invention to detect a cashout event for a typical gaming machine.

The process will be described in more detail with reference to FIG. 5. The process is initiated by the EGM 502 upon notifying the host slot accounting system 520 via the SMIB 525 that a cashout ticket is being requested. The PCU 510 operates to detect this event in one or both of two ways. First of all, the EGM 502 may send a cashout ticket printing command on the primary SAS 504 and secondary SAS 506 ports. This command can be detected by the PCU 510. Secondly, the EGM 502 will initiate printer activity by sending printer commands over the printer port 508. The PCU 510 can detect and intercept these commands as it sits between the EGM 502 and the printer 530. Upon detection of the printer activity and or the cashout command, the provision of the paragaming activity is initiated.

In operation, the PCU 510 captures the printer message on the printer port 508 before the ticket begins to print. If the customer elects to pass on participation in the paragame, the PCU 510 then passes the printer message on to the printer 530. However, if the customer elects to participate in the paragame (i.e., to make a purchase) the data intended to be printed onto the ticket is then parsed to identify an asset number, a validation number, a date and a time. This information is then sent via the Ethernet connection to the Validation Redemption Server (VRED™) 522. If the captured ticket is not a cashout ticket, or if the VRED™ server 522 is not connected or otherwise not able to process redemptions, the PCU 510 continues to pass the ticket printing information directly to the printer for a normal cashout process.

Using the information extracted from the ticket printing commands, the VRED™ server 522 acts as a virtual Electronic Gaming Machine (EGM) and redeems the full value of the ticket from the Host Accounting System 520 through a second SMIB board 526 connected between the VRED™ server 522 and the Host Accounting System 520. The VRED™ server 522 is considered another EGM to the Host Accounting System 520. The second SMIB 526 associated with the VRED™ server 522 is enrolled to the Host Accounting System 520 with an asset number like any other EGM. As such, the VRED™ server 522 is tracked monetarily like any other EGM.

It should be appreciated that the system configuration described herein may also be employed to provide a variety of other capabilities. In fact, applications can be provided to the EGM by assigning a unique transaction ID for the application and then using one unique SMIB for each unique transaction ID. For instance, a transaction ID could be assigned for Races, and one for Sports and then an SMIB would be used to provide access for these applications into the system. Further, this can be broken down more granularly by assigning a unique ID and using a dedicated SMIB for individual sports (i.e., football, baseball, boxing, etc).

It should be appreciated that in an exemplary embodiment, the PCU does not present the paragaming interface until the VRED™ server has successfully redeemed the original cashout ticket or an equivalent event has been completed. For instance, the PCU could obtain the necessary information from the SAS, or some other network accounting protocol, to poll the EGM to identify or verify the money that presently exists on the meter. Thus, the PCU needs to know how much money is available for wagering on the paragame. After the PCU receives the placement of a wager, the PCU then instructs the VRED™ server regarding the remaining balance. After the VRED™ server has redeemed the full value of the ticket issued by the EGM, the VRED™ server subtracts the amount required to make a purchase and validates a ticket with the Host Accounting System for the remaining amount of money. The VRED™ server then performs the cashout function by sending modified printer commands to the PCU for delivery to the printer and for printing a cashout ticket.

Figure 6:
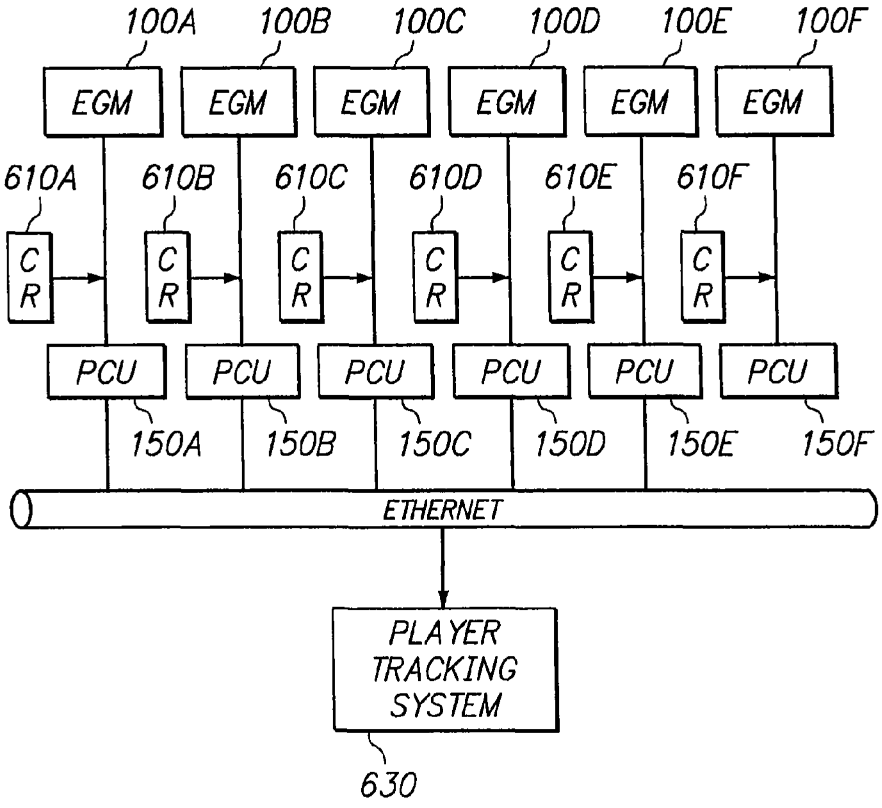
FIG. 6 is a block diagram illustrating an exemplary embodiment of the invention for providing enhanced capabilities through card reader access.

FIG. 6 is a block diagram illustrating an exemplary embodiment of the invention for providing enhanced capabilities through card reader access. This aspect of the present invention allows the PCU to provide additional functions not normally available to the EGM. For instance, the PCU may be configured to communicate with a card reader 610*a-f*. In such event, if a card is entered into the card reader 610*a-f*, the EGM 100*a-f* would examine the card to determine if it is valid. If the card is not valid, the PCU 150*a-f* may then examine the card to determine if a special feature is to be provided. An example of one such feature would be for the PCU 150*a-f* to detect that the card is a credit card and then invoke the proper clearing house systems to extract funds on behalf of the player. Similarly, the card may be identified as an ATM card and the PCU 150*a-f* could then operate as an ATM machine. In essence, embodiments of the present invention could be configured to provide any service desired related to the reading of a card in the card reader 610*a-f*. This aspect of the present invention enables the PCU to ID players and then associate game play etc. with that player to be able to direct CASHOUT propositions, advertisements, games, screen format, etc. In one embodiment, as indicated above, the PCU might also be configured to communicate with a player tracking system or server 630 of the host gaming system. For example, the following steps may be included in such a process:

Player inserts card

PCU sends inquiry for player data to player tracking server 630

Player tracking server 630 responds with current player data

Session play tracked locally

Player record updated with session data upon card removal

Figure 7:
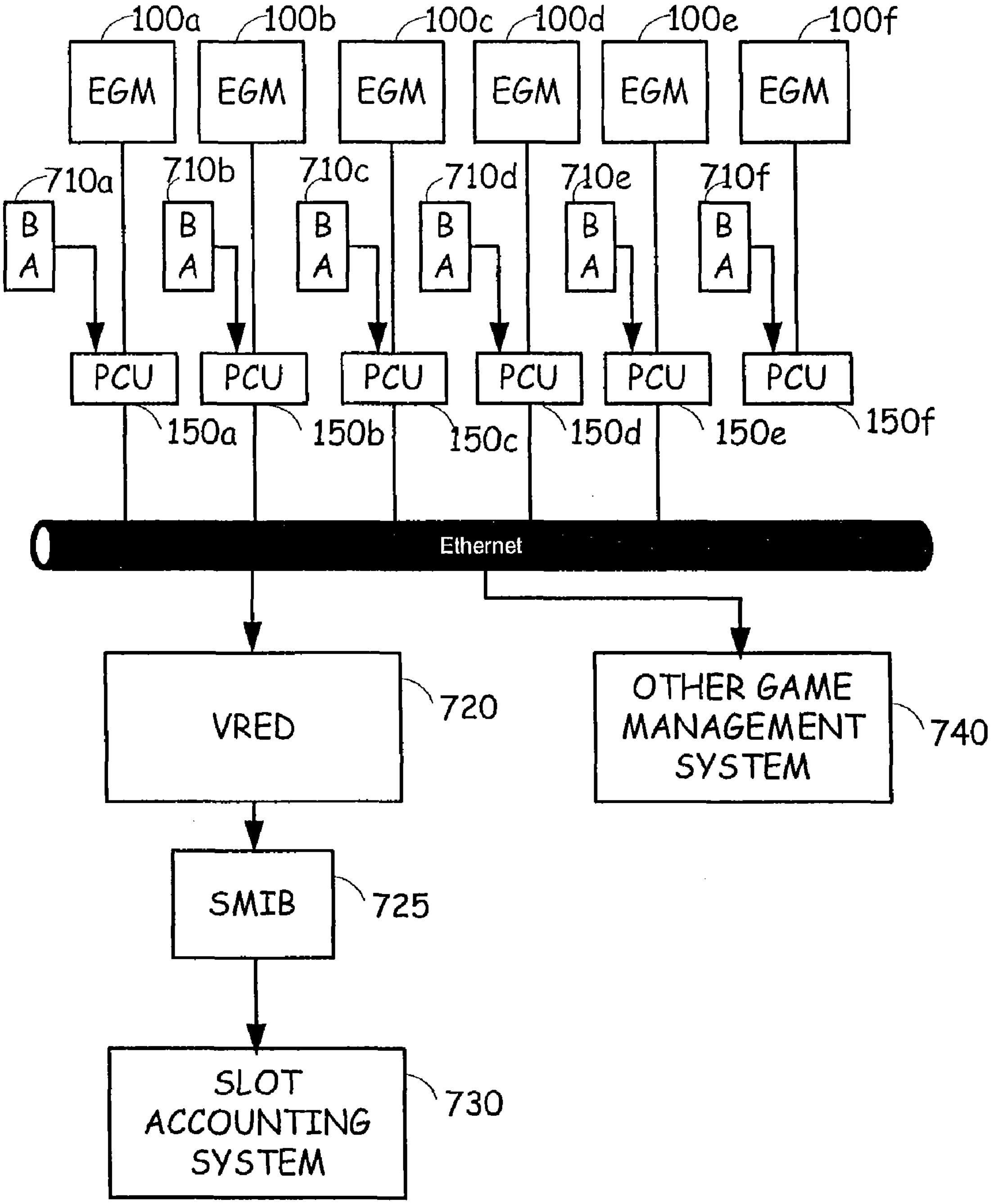
FIG. 7 is a block diagram illustrating an exemplary embodiment of the invention for providing enhanced funds transfer capabilities through controlling the bill acceptor.

It should also be noted that if the paragaming event includes payout capabilities, that the balance in the Host Accounting System may also be increased by any winnings earned in the paragaming event. FIG. 7 is a block diagram illustrating an exemplary system that would enable the transfer of funds obtained or won through a paragaming application to the customer via various means. The connection between the EGM 100 and the bill acceptor 710 is broken and the PCU 150 interfaces to the billing acceptor 710 instead. In operation, if a paragame results in a monetary win for the customer, the PCU 150 can execute commands common to the bill acceptor 710 to institute a cash-in or ticket-in event and thus, increase the credit in the machine. Thus, this aspect of the present invention enables the PCU to move funds on to the EGM by "virtually" inserting a cash voucher into the Bill Acceptor (BA) path. In addition, it enables the PCU to read and validate vouchers from other game management systems (e.g. OPTIMA™, Race and Sports, etc.) and move funds onto the EGM.

As a non-limiting example, the application of one or more of the above-described embodiments of the present invention is described using a particular configuration. In this configuration, a slot machine is used to parasitically provide a customer with a NEVADA NUMBERS® interface. As such, the following process takes place during a typical NEVADA NUMBERS® transaction via a PLAYERVISION™ system embodying aspects of the present invention. Once a cash-out is initiated, the game unit will log the value of the funds in the gaming machines voucher-out meter as it normally would do (e.g. $20). The PCU then steps the customer through the selling proposition for NEVADA NUMBERS® as described above. If the customer proceeds with the purchase of a NEVADA NUMBERS® ticket (via the PLAYERVISION™ system), then the PCU will redeem the value of this cashout onto the PCU and it is properly recorded on the casinos slot accounting software with a unique associated asset number and the ID number of the utilized EGM. The PCU will then validate with the Game Management System the transactions and return to the PCU the appropriate information in order to print a valid ticket. The PCU then deducts the cost of the NEVADA NUMBERS® transaction (e.g. $2) and then validates the balance with the casino's slot accounting system using the asset ID from the SMIB connected to the VRED™ server in order to properly print a cash-voucher equal to the remaining balance (e.g. $18). For further auditing and reporting purposes, reports are provided, in addition to standard transaction reporting, so a transaction can be identified and traced to a specific EGM and time. It should be noted that in a typical embodiment, the PCU will not allow the selling process to take place if the gaming machine returns a value upon a cash-out event that is less than the minimum transaction amount. Additionally the PCU will limit the number of NEVADA NUMBERS® tickets to be purchased such that it does not exceed the amount returned from the gaming machine upon a cash-out event and/or the maximum number of multi-race tickets allowed. However, in other embodiments, it will be appreciated that the customer's credit card can be used to pay the remaining balance of any request tickets or, the customer could be prompted to enter additional money into the machine.

Thus, advantageously, the present invention allows the provision of paragaming activity by connecting to a single SMIB, or multiple SMIBs in some embodiments for each desired level of control and accounting, in the back office to interact with the Host Accounting System without the need for cooperation from the slot accounting software vendor to develop a software interface to the Host Accounting System software. The Host Accounting System interprets the PCU as just another electronic gaming machine on the network. On most electronic gaming machines there are at least two SAS ports. The PCU in various embodiments of the present invention connects to one of the SAS ports to interrogate and obtain certain information and control certain aspects of gaming machine as described above. The other SAS port connects to the SMIB in the slot machine. These connections are typically IEEE 485 or RS-232. All of the PCUs connect to VRED™ server via an Ethernet or other communication connection. The VRED™ server connects to one or more SMIBs, typically located in the back office.

The VRED™ server looks like another electronic gaming machine (EGM) to the Host Accounting System. The VRED™ server reports metered coin in, metered voucher dropped, and total drop to the Host Accounting System. The PLAYERVISION™ system does not need to accept money directly from a bill acceptor; however, in some embodiments the system may be enabled to accept such payments. All money transferred can come from vouchers captured from the EGM printer, therefore the EGM soft count is not affected. In a voucher based embodiment, at the time of cash out, the customer receives a voucher. This voucher can then go to cashier or back into machine. At the end of day, the casino knows the number of vouchers given out, so all money-in matches data received. When a paragame is offered and participation funds are extracted from the EGM, this would result in a disparity in accounting at the end of the day. Thus, embodiments of the present invention may employ the use of a printer in server room that is tied to the VRED™ server. When a customer pays for a paragame, the VRED™ server causes a voucher for the cost of the paragame to be printed out on behalf of player. As a specific example, suppose a player puts $10 into a machine and plays for a few minutes. The player loses $2 in the machine and then requests a cash out. Normally, this would result in printing out of an $8 voucher. However, in the present invention, this cash out request is captured and the system offers a $2 entry fee for a paragame. If this offer is accepted, the system prints out a $8 voucher in server room. In the Host Accounting System, the VRED™ server will show up as an EGM reporting coin in, voucher in, and voucher out. The VRED™ server will only show profit, since it is accepting money for another entity, such as the Race and Sport Book or Keno Lounge.

In a preferred embodiment, the VRED™ server not only appears like another electronic gaming machine to the Host Accounting System, but appears as a multi-game EGM. In particular, the VRED™ server is configured to track different paragaming activities using different game play meters in the same manner as a multi-game EGM. The Host Accounting System may poll the VRED™ server for individual paragame statistics or information. This allows the Host Accounting System to track marketing and auditing information related to the various paragame activities in the same manner that it would track individual games implemented by the actual EGM of the gaming machine.

In one embodiment, the VRED™ server connects to multiple SMIBs. If multiple PCUs request redemptions at substantially the same time, the VRED™ server may not be able to process those requests through a single SMIB within a required time (such as a maximum time to prevent a communication time-out or a maximum time allowed to redeem a ticket to prevent long delays to the customer). The number of SMIBs may be selected to ensure that the VRED™ server can sequentially process maximum simultaneous requests in a timely manner.

The invention may be configured to process transactions involving only a single paragaming activity or event, or multiple activities or events. For example, the invention may be configured in a manner that a player may be permitted to purchase a single keno ticket. That purchase transaction may be processed as a single event. In other configurations, the player may be permitted to select a number of items, such as purchasing a number of keno tickets, placing one or more sports wagers, or combinations thereof in “shopping cart” fashion.

In one embodiment, a player might be permitted to build a “wish list” of items, such as a variety of types of wagers or purchases. This wish list might be compared to the player’s cash-out balance to determine if the wish list can be fulfilled. Wish list items might include gift certificates for a restaurant, hotel or spa. All of the player’s selections may be processed either one at a time, or in group fashion. The wish list could also be stored, such as for use by a third party (such as a relative or friend) to make purchases for that player (such as by purchasing them a designated gift certificate).

As one paragaming activity, a player may be offered “bundles” of items. For example, as indicated above, various paragaming features may be offered via different systems or servers (such as keno tickets via a Game Management System and race/sports wagers via a Race and Sports Book Server). In one embodiment, a central server (not shown) or the VRED™ server (as configured with a particular application) may be configured to combine items or offers facilitated by those servers. For example, the player might then be offered the opportunity to purchase a $2 keno ticket via the Game Management System or place a $5 sports wager via the Race and Sports Book Server, or place a $6 wager to obtain both a $2 keno ticket and a $5 sports wager. This allows the opportunity for the operator to driver business towards underperforming assets.

Thus, embodiments of the present invention allow funds to be moved off and onto the electronic gaming machine without having to deal with different versions of the slot accounting software. In addition, because a system employing the present invention is viewed by the slot accounting system as a unique slot machine with a unique asset id, the accounting department is able to determine what the transactions were by the PCU sending up to the slot accounting system unique asset numbers for each unique transaction. As such, when a report is generated, all the results for a particular asset number can be compiled. Thus, different asset numbers can also be used to identify transactions for different paragaming activity (i.e., sports bets, keno tickets, lottery tickets, etc.).

Thus, embodiments of the present invention provide paragaming activity on an electronic gaming machine by detecting a triggering event on the electronic gaming machine. In one embodiment the triggering event may be a cashout event, however, other events are also anticipated by the present invention. In response to the triggering event, a paragaming event is presented on the screen of the electronic gaming machine and the customer is invited to participate. If the customer elects to participate, the funding of the paragaming event is subtracted from the available funds in the electronic gaming machine. The payment for the paragaming event is then reconciled with the accounting system for the electronic gaming machine. This can simply be accomplished by performing a voucher in command followed by a cashout command. As such, the activity is recorded in the accounting system for report purposes.

In one embodiment, a session identifier or “session ID” may be utilized to identify a particular set of transactions (whether involving only a single item or multiple items) within the system. For example, a session ID may be assigned to a particular player transaction in which the player wishes to purchase both a keno ticket and place a sports wager. This session ID may be stored at the VRED™ server. Detailed transaction information may be stored in association with the session ID. In this manner, transactions may be “audited”, allowing all sessions with particular PCUs to be identified, and allowing all transactions associated with particular sessions to be identified.

As one feature of the invention, paragame transaction information might be displayable at the EGM as a result of such transaction tracking. For example, the PCU might be provided with a call function (such as accessible via a menu or an activation button on the PCU). Such a call function may transmit a request for transaction information to the VRED™ server. This call function may include the asset number for the PCU. The VRED™ server may then generate transaction information associated with that PCU and transmit the transaction information back to the PCU. The PCU may then be configured to display or otherwise output that information, such as via the display of the gaming machine. For example, in the event a player disputed a particular paragame transaction, an attendant might call the most recent transactions from the VRED™ server for display at the gaming machine via the PCU. This information could then be reviewed.

In one embodiment, by tracking particular transactions, a player might be presented with a list of most popular paragaming activities (such as most popular race/sports book wagers, etc.), or the most popular paragaming activities within a subset of the total paragaming activities (such as the top ten paragaming activities in total or the top ten race and sports wagers). Such information may even be customized to the player. For example, if a particular player regularly places sports bets upon Chicago Bears football games, that player may be presented with a particular sports book wager paragaming activity which comprises a Chicago Bears football game wager.

In one embodiment, as indicated, a VRED™ server may communicate with multiple SMIBs. In that instance, each SMIB may have separate meters for tracking each type of event which it processes. For example, if the SMIBs are configured to process both keno transactions and race/sports wagers, each SMIB may have separate meters for each of those types of events. In another embodiment, however, particular SMIBs may be configured to process particular transactions, and thus have only a meter or meters for those particular transactions. For example, one SMIB might be dedicated to processing keno ticket transactions, and another SMIB might be dedicated to processing race/sports book wagers. Of course, in the event a player engages in a transaction involving different types of events (such as purchase of a keno ticket and placing a race/sports wager in a single event), the PCU or VRED™ server might be required to split the transaction so that the appropriate SMIB processes the particular portions of the transaction.

The system could also be configured so that there are multiple VRED™ servers. In one embodiment, multiple VRED™ servers could be configured to process particular transactions, in the same manner as described above relative to the SMIBs. In another embodiment, multiple VRED™ servers might be provided for redundancy purposes. For example, PCUs might be assigned to a primary VRED™ server. If that VRED™ server is inoperable, the PCUs may be configured to transmit to a secondary VRED. In one embodiment, there might be only two VRED™ servers (a primary and a secondary). In other embodiments, there might be multiple VRED™ servers. Certain PCUs might be assigned to a first VRED™ server as a primary VRED™ server. That same VRED™ server might serve as the secondary VRED™ server for other PCUs.

As indicated, the PCU may be configured to work in systems utilizing communication protocols other than SAS. Such communication protocols may be other gaming communication protocols adopted by the Gaming Standards Association (GSA), or other protocols now known or later developed.

In one embodiment, the system and method may be configured so that the results of paragame activities or events may be reported at the EGM. For example, the system and method may be configured so that the PCU may report a winning keno ticket via the display of the EGM. Such an event may also include associating winnings for the event to credits at the gaming machine. In this regard, in one embodiment, winning tickets or other winning events may be presented at the gaming machine. In other embodiments, such winning tickets or events might be presented at other locations. For example, a winning keno ticket might be redeemed at a cashier station or remote kiosk.

In one embodiment, the system and method of the invention may be configured to permit a player to not only utilize funds associated with a machine/EGM at a cashout event to participate in a paragame event, but may permit a player to add funds. For example, a player may have only $20 in credits associated with the gaming machine at cash out. The player might wish to participate in $30 worth of paragame activity. In such event, the player may be permitted to associate additional funds ($10) with the gaming machine in order to fund the paragame activity.

As indicated herein, the paragaming activity which may be facilitated by the system and method of the invention may vary. Such may include purchase of keno or other gaming tickets, participation in other wagering events, such as race/sports events, and even purchase or participation in non-gaming events. For example, a player might be able to purchase show or concert tickets, purchase food or beverage or the like.

Other embodiments of the invention are contemplated. In one embodiment, the EGM 100 need not include a printer. For example, information which is normally printed on a ticket might be associated with other media, such as a magnetic stripe of a player card or be associated with a smart card or the like. In such event, the EGM 100 might include a card writer/reader or the like. In other embodiments, a printer could be located remotely from the EGM, such as associated with a bank of EGMs.

The above-described embodiment details an accounting configuration where activities which are implemented or supported by the PCU are integrated with the existing or legacy casino accounting system. While such a configuration has a number of advantages, the configuration is complex, such as requiring the above-described feature of a validation/redemption server 522 or similar technology in order to "translate" accounting-related activities associated with the PCU so that they can be integrated with the accounting information which corresponds to the main gaming controller of the gaming machine.

Figure 8:
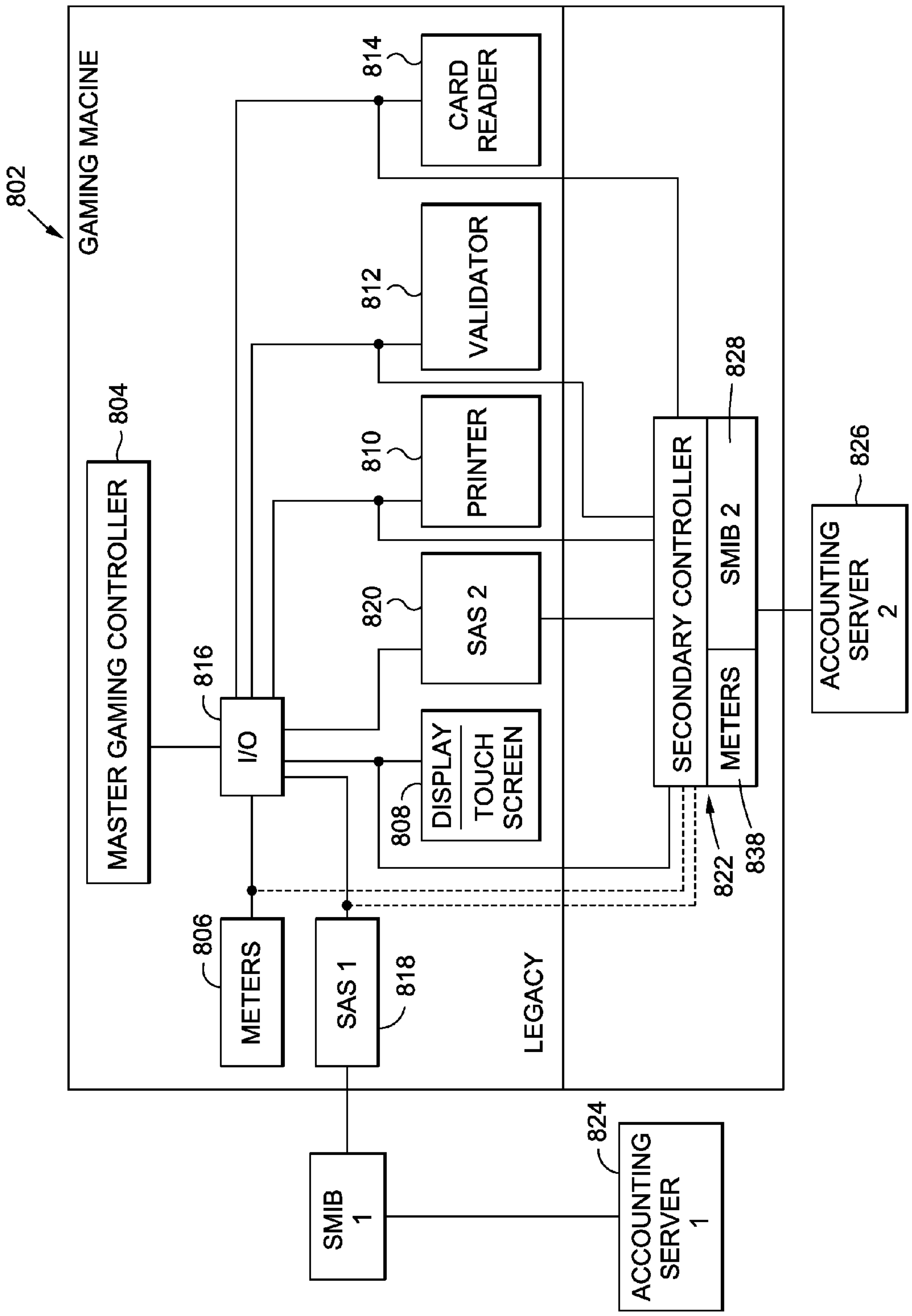
FIG. 8 is a block diagram illustrating another embodiment of the present invention.

In another embodiment of the invention, a "dual" accounting system is utilized. FIG. 8 illustrates one example of such a configuration. Similar to the configuration described above, paragaming activities or similar features or functions may be implemented by an "interposed" secondary controller or PCU.

As illustrated, a gaming machine 802, such as a legacy gaming machine, has a main or master gaming controller 804. The master gaming controller 804 may interface or communicate with a variety of peripheral devices, such as one or more meters 806, one or more video displays and or associated touch screens 808, one or more printers 810, one or more bill/ticket and/or voucher validators 812, one or more card readers or other media readers (RFID readers, etc.) 814, and/or other devices, such as via an input/output interface (such as a bus) 816. The master gaming controller 804 may also transmit information to or receive information from one or more communication devices or ports, such as a slot accounting system communication port. As illustrated, the gaming machine 802 might include two or more of such ports, such as a primary slot accounting system or SAS1 port 818 and a secondary slot accounting system or SAS2 port 820.

In a manner similar to that described above, a secondary controller or PCU 822 may be associated with the gaming machine 802. Preferably, the PCU 822 is "interposed" so that it is not directly connected to the master gaming controller 804 and/or does not alter the operation or configuration thereof. Instead, the PCU 822 is interfaced to the communication pathways between the master gaming controller 804 and one or more of the peripheral devices, ports or other features, permitting the PCU 822 to "see" communications therebetween and, if desired, alter those communications (such as by providing one or more modified signals or information), such as to implement paragaming or other secondary gaming machine activities or features. Such a configuration is detailed in U.S. patent application Ser. No. 11/897,532, filed Aug. 30, 2007, which is incorporated herein in its entirety by reference.

The gaming machine 802 is configured to implement primary accounting functionality and preferably communicates with a casino accounting system. Such a system may include one or more casino accounting servers 824 and/or other devices. In one embodiment, accounting related information is exchanged between the gaming machine 802 and the casino accounting server 824 via the primary SAS1 port 818, such as via a first SMIB1.

In accordance with this embodiment of the invention, accounting related information associated with the PCU 822 is exchanged with a secondary accounting system. This secondary accounting system may comprise one or more secondary accounting servers 826. For example, the PCU 822 may either include or be configured to communicate with a second SMIB2 828 which is, in turn, in communication with the remote secondary accounting server 826. When the gaming machine 802 includes a secondary SAS2 port 820, the PCU 822 may obtain information directly from that port. In other embodiments, the PCU 822 could obtain information from the main SAS1 port 818, such as by a communication link which interfaces to a communication link between the master gaming controller 804 and the SAS1 port 818.

In such a configuration, transaction/accounting activities which are implemented or processed by the PCU 822 are monitored and tracked via the secondary accounting server 826. That information is not provided to the main casino accounting server 824 in the manner described above.

Figure 9:
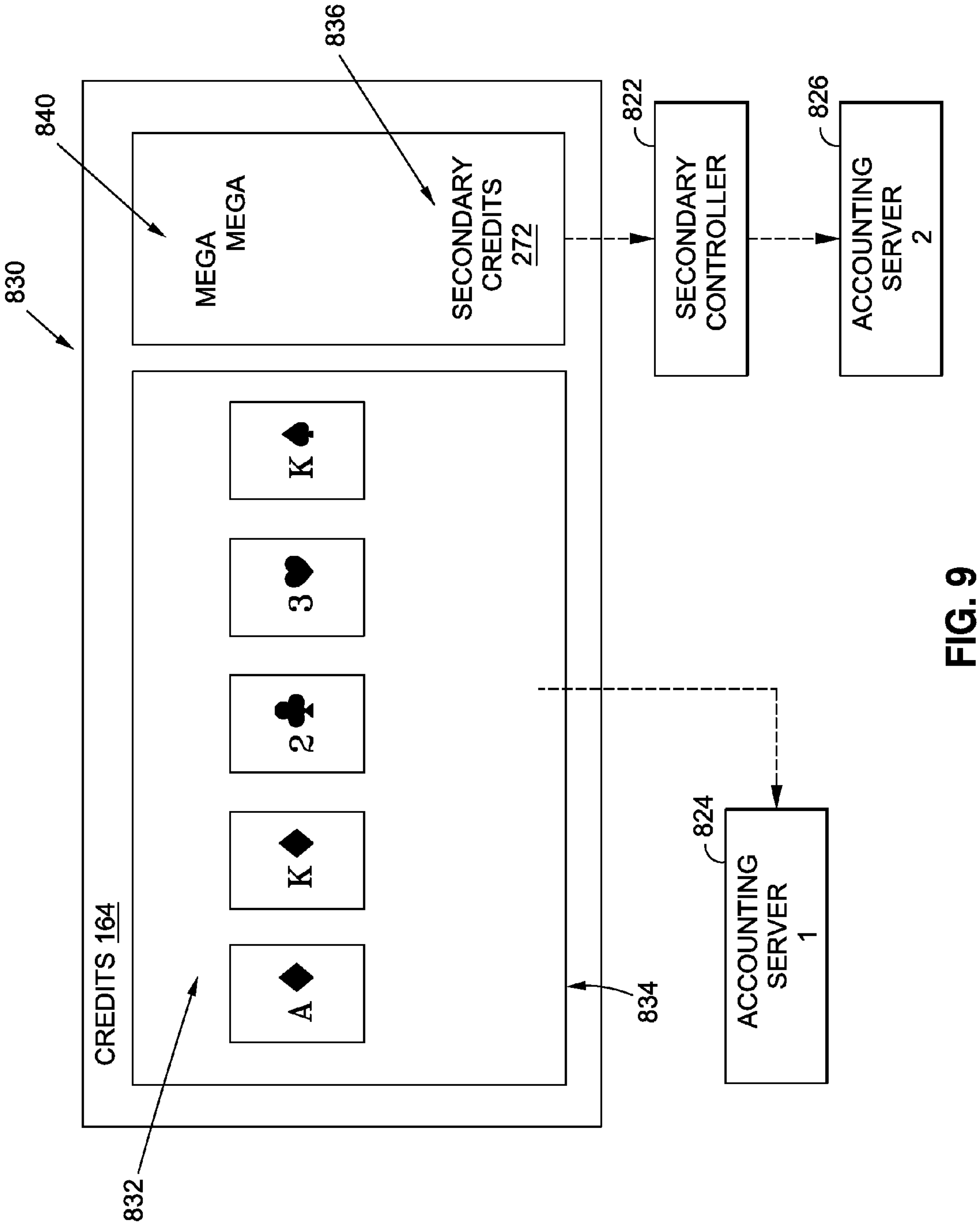
FIG. 9 illustrates a gaming machine display which displays information in accordance with an implementation of the invention.

The "dual-accounting" configuration of the invention may be utilized in a number of manners. One example of an embodiment of the invention will be explained relative to FIGS. 8 and 9. As illustrated therein a gaming machine has a display 808 (such as one or more electronic video displays) which is configured to display game information. The gaming machine 802 has a master or main gaming controller which is configured to implement main game functionality, such as a video poker game. As such, main or base game information 832, such as video poker game information, may be displayed on the display 830.

In order to play occurrences of the video poker game, the player is preferably required to place a wager. A player may associate funds with the gaming machine 802, such as via coins, bills, a credit or debit card, ticket or other media, by transfer or other means. Such funds are preferably represented as one or more main or primary game credits. Preferably, the master gaming controller 804 of the gaming machine tracks and indicates to the player, such as via the display, a running total of the primary credits 834 which are available to the player. This running total generally comprises the funds or credits which the player initially associates with the gaming machine, less any credits which are wagered, plus any credits which are awarded to the player, plus any funds or credits the player later associates with the gaming machine. Information regarding the funds or credits which the player associates with the machine, the credits which are wagered, the credits which are won and the like is exchanged with the casino's accounting server 824.

In this embodiment, a PCU 822 has been associated with the gaming machine 802 and has caused the display 808 thereof to display secondary information 840, such as regarding a paragame called "Mega Mega." In one embodiment, a player may associate funds or credits with the gaming machine 802 which may be used for secondary or paragaming activities. These funds or credits may be represented as "secondary credits" 836.

For example, in one embodiment, when a player inserts a monetary bill into a bill validator 812 of the gaming machine, the PCU 822 detects the insertion of the bill and its value via information transmitted to the bill validator 812. In receipt of that signal, the PCU 822 may cause the display 808 to display a prompt from the player as to whether the player wishes the funds to be represented as main credits or secondary credits. If the player selects "main credits," the PCU 822 sends the bill information on to the master gaming controller 804, which increases the number of main credits 834 accordingly and transmits information regarding the accepted bill/monies to the casino accounting server 824. If the player selects "secondary credits," then PCU 822 prevents information regarding the accepted bill from being transmitted to the master gaming controller 804. Instead, the PCU 822 increases the number of secondary credits 836 by the amount of the bill and that information is exchanged with the secondary accounting server 826 (but not the casino accounting server 824 because information regarding the accepted bill is not received by the master gaming controller 804 of the gaming machine and thus can't be provided to the casino accounting server 824).

Thus, the master gaming controller 804 and casino accounting server 824 track the main or primary credits 834 and the PCU 822 and the secondary accounting server 826 track the secondary credits 838 (although, as described below, the PCU 822 may additionally track primary credits 834). Of course, bills and/or coins which are provided to the gaming machine 802 may be centrally stored. Thus, funds in the cash/coin box(es) of the gaming machine (or tickets or other media representing funds provided to the machine and/or funds paid out) must be reconciled relative to the information tracked by both accounting servers.

For example, a player may deposit a $20 bill with a bill validator 812 of the gaming machine 802. The bill validator 812 sends a signal to the master gaming controller 804. This signal is intercepted by the PCU 822. The PCU 822 may then cause the display 808 of the gaming machine 802 to display information seeking input from the player as to an allocation of the funds (such as by providing a substitute signal to the display 808, which substitute signal causes the display 808 to display such a funds allocation inquiry when such an inquiry would not have been displayed by the gaming machine without the PCU 822). The player might provide input (such as via a touch screen or button) that the player wishes to designate $10 towards main credits and $10 towards secondary credits. The PCU 822 may then send a substitute signal to the master gaming controller 804 which indicates that $10 has been input to the gaming machine (rather than the original signal from the bill validator 812 which indicated that $20 was input). As a result, the master gaming controller 804 causes the number of main game credits to increase corresponding to the $10 allocated to main credits. The PCU 822 then credits the other $10 to secondary credits.

Of course, in this configuration, only a single $20 bill was deposited to the gaming machine 802 and will be present in the cash box. Thus, in order to reconcile the $20 bill in the machine, the casino will sum the $10 credited to main credits as tracked by the casino accounting server 824 and the other $10 credited to secondary credits as tracked by the secondary accounting server 826.

In one embodiment of the invention it is possible for the secondary accounting system and server 826 to entirely supplant the existing casino accounting system and server. In particular, the PCU 822 may be configured to monitor or track all activities at the gaming machine.

As one example, referring to the example given above, the PCU 822 can track the receipt of $20 to the machine via the bill validator 812 and then the $10 allocation to main credits and $10 to secondary credits. Of course, the PCU 822 can track the use of the secondary credits directly, as such credits are wagered via the PCU 822. In addition, however, the PCU 822 may monitor the main game credits, including increases or decreases in main game credits. For example, in the event a player cashes-out their main game credits, the master gaming controller 804 will send a signal a coin dispenser, cash dispenser, ticket printer or the like. The PCU 822 may intercept those signals and thus learn of the amount of credits being paid to the player. In the event of an award of credits on the main game, the master gaming controller 804 may send a signal to one or more meters 806 or send such information for display by the display 808. The PCU 822 may intercept or translate this information in order to determine what transactions have occurred and/or the value thereof. In such a configuration, both the existing or legacy accounting and the accounting associated with the secondary or paragaming activities may be implemented or tracked via the PCU 822 and the associated secondary controller 826 (thus eliminating the need for the casino accounting server 824).

The same principles of the invention may be applied to tickets, vouchers or the like. As described in U.S. Pat. No. 6,048,269 to Burns, which is incorporated herein in its entirety by reference, the gaming machine 804 may be configured to dispense tickets representing value or may be configured to accept tickets representing value. This ticket issuance and acceptance functionality may be incorporated into the base configuration of the gaming machine 802, such as via the master gaming controller 804 and printer 810. Information regarding primary tickets may be associated with the casino accounting server 824, such as for validating the tickets.

In accordance with the present invention, the PCU 822 may be configured to implement secondary ticket issuance and acceptance technology. In this manner, the PCU 822 might be configured to issue "secondary" tickets or vouchers. For example, a player may seek to cash out secondary credits which are associated with the gaming machine 802. At that time, the PCU 822 may cause the printer 810 to print a secondary ticket representing a number of credits/monetary value. Information regarding the issued secondary ticket (such as a ticket code and associated value) is preferably associated with the secondary accounting server 826 for later use in validating that ticket. In addition, however, the PCU 822 may facilitate accounting of primary tickets.

As one example, a gaming machine might issue a primary ticket representing a number of primary credits/monetary value, which ticket and its associated value is known by the casino accounting server 824. This ticket might be presented to the gaming machine 802 by a player. The PCU 822 may intercept a signal from the validator 812 of information which was read from the ticket by the scanner 812. The PCU 822 may utilize that information to determine that the ticket is a "primary" ticket (as opposed to a secondary ticket issued by the PCU 822 or a PCU of another gaming machine). The PCU 822 may then pass that information on to the master gaming controller 804 for use by the master gaming controller 804 in validating the ticket with the casino's accounting server 824 and then crediting primary game credits 834 representing the value of the ticket.

If the player had presented a secondary ticket to the gaming machine 802, the PCU 822 would have determined that fact from the information transmitted by the validator 812. The PCU 822 could have intercepted that information (i.e. information regarding the ticket is not transmitted to the master gaming controller 804) and then transmitted it to the secondary accounting server 826 for validation and crediting to the gaming machine 802, such as in the form of secondary credits 836.

In certain embodiments, after a ticket (primary or secondary) has been validated, the player may elect to credit the representative value of that ticket to either primary credits 834 or secondary credits 836 (or both). In this regard, as one aspect of the invention, the PCU 822 may be configured to act as a kiosk or other device which can be used to move credits between the accounting systems. For example, a player might have accrued 100 secondary credits 836. The player might seek to move those secondary credits 836 to primary credits 834. Such an option may be presented to the player, such as via the secondary interface/information 840. In such a configuration, the PCU 822 can send a signal to the master gaming controller 804 or the main accounting server 824 regarding a number of primary credits 834 corresponding to the secondary credits 836 which have been cashed out or moved, which secondary credits 836 are then credited to the gaming machine 802 as primary credits 834 by the master gaming controller 804 (i.e. the number of primary credits 834 is updated (increased) by the master gaming controller 804 and reported to the casino's accounting server 824). The PCU 822 then updates the number of secondary credits 836 on the display 830 and reports the transaction to the secondary accounting server 826 (deducting the secondary credits which were transferred).

When a player cashes out of the gaming machine 802, the player may cash out either the primary credits 834, the secondary credits 836, or both. For example, a player might wish to cash out their primary credits 834. The player might elect such an option via either the main game information 832 or the secondary game information 840. Upon sensing this election, the PCU 822 might query the player whether they wish to move the primary credits 834 to secondary credits 836. If not, the PCU 822 may simply allow the printer 810 to print a primary ticket or voucher representing the primary credits. If the player elected to move the primary credits 834, the PCU 822 might credit the primary credits 834 to the player's secondary credit 836 count (in that event, the number of cashed-out primary credits is reported to the casino accounting server 824, such as to zero them, and that value is reported to the secondary accounting server 826).

In yet another embodiment, the player might cash out both the primary and secondary credits at the same time. In that event, the PCU 822 may credit the primary credits 834 to the secondary credit 836 count and then cause the printer 810 to issue a single ticket or voucher which represents the total number of credits. Similarly, the PCU 822 could cause some or all credits belonging to a player (primary or secondary) to be transferred to one or more accounts (such as electronic casino accounts, external financial accounts, etc.).

As indicated herein, the secondary accounting functionality is preferably implemented via a secondary controller or PCU 822. In the preferred embodiment, the PCU 822 does not interface directly with the master gaming controller 804, but is configured to monitor and/or alter signals or information which is transmitted along communication pathways to and/or from the master gaming controller 804, such as between the master gaming controller 804 and one or more gaming machine peripheral elements. In this manner, the PCU 822 can implement the functionality described herein without the master gaming controller 804 being updated or modified (which would require the gaming machine 802 to undergo re-approval of gaming authorities in jurisdiction such as the State of Nevada).

As indicated above, the gaming machine 802 preferably has one or more accounting meters 806. In a preferred embodiment, the PCU 822 can monitor those primary meters 806, such as to obtain a "snapshot" of the values associated with those meters. However, the PCU 822 can not alter the information which is recorded by those meters 806, thus preserving the autonomy and integrity of the primary meters 806.

In one embodiment, the PCU 822 may include one or more secondary meters 838. These secondary meters 838 may be used to record or track transactions which are performed by the PCU 822, in similar manner to the way the primary meters 806 record or track transactions processed by the master gaming controller 804.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming machine comprising:

a housing;

a master gaming controller;

a plurality of gaming machine peripherals communicating with said master gaming controller via one or more communication links, said plurality of gaming machine peripherals comprising an electronic video display, a credit accepting device configured to receive a physical item representing monetary value for at least partially funding at least one of a primary credit balance of primary credits and a secondary credit balance of secondary credits from which wagers may be placed and at least one input device via which a player may place a wager from at least one of said primary and secondary credit balances and initiate a cash-out of at least one of said primary and secondary credit balances;

said master gaming controller configured to track a number of primary game credits associated with said primary credit balance and to report primary accounting information to a casino accounting system; and a secondary controller, said secondary controller in communication with one or more of said communication links and configured to implement secondary game functionality at said gaming machine, including presenting secondary game information at said electronic video display, said secondary controller configured to track a number of secondary game credits associated with said secondary credit balance and to report secondary accounting information to a secondary accounting system separate from said casino accounting system.

2. The gaming machine in accordance with claim 1 wherein said gaming machine includes a first slot accounting system communication port and said master gaming controller reports accounting information to said casino accounting system via said first slot accounting system communication port.

3. The gaming machine in accordance with claim 2 wherein said secondary controller is in communication with a communication link between said master gaming controller and said first slot accounting system communication port.

4. The gaming machine in accordance with claim 2 wherein said gaming machine further includes a second slot accounting system communication port and said secondary controller is in direct communication with said second slot accounting system communication port to receive primary accounting information from said master gaming controller.

5. The gaming machine in accordance with claim 1 wherein said master gaming controller communicates with said casino accounting system via at first slot machine interface device and said secondary controller communicates with said secondary accounting system via a second slot machine interface device.

6. The gaming machine in accordance with claim 1 wherein said master gaming controller causes said electronic video display to display information to a player regarding said primary credit balance and said second controller causes said electronic video display to display information to a player regarding said secondary credit balance.

7. The gaming machine in accordance with claim 1 wherein said plurality of gaming machine peripherals comprises a ticket printer and said master gaming controller is configured to cause said ticket printer to print primary tickets having a value of primary credits of said primary credit balance and said secondary controller is configured to cause said ticket printer to print secondary tickets having a value of primary credits of said primary credit balance and/or secondary credits of said secondary credit balance.

8. The gaming machine in accordance with claim 1 wherein said credit accepting device comprises a reader configured to read currency input by a player and wherein said secondary controller is configured to permit said player to credit a value of said currency as either primary game credits to said primary credit balance or secondary game credits to said secondary credit balance.

9. The gaming machine in accordance with claim 1 wherein said plurality of gaming machine peripherals further comprise a least one printer and at least one media reader.

10. The gaming machine in accordance with claim 1 wherein said secondary controller further comprises at least one secondary meter configured to log information regarding said secondary credits.

11. A method of accounting at a gaming machine having a master gaming controller configured to present primary gaming functionality, a secondary gaming controller configured to present secondary gaming functionality, at least one electronic display device configured to display game information related to said primary and secondary gaming functionality, a credit accepting device configured to receive a physical item representing monetary value for at least partially funding at least one of a primary credit balance of primary game credits and a secondary credit balance of secondary game credits from which wagers may be placed, at least one input device via which a player may place a wager from at least one of said primary and secondary credit balances and initiate a cash-out of at least one of said primary and secondary credit balances, comprising:

transmitting information regarding said primary credit balance from said master gaming controller to a casino accounting system over a first communication link between said master gaming controller and said casino accounting system; and transmitting information regarding said secondary credit balance from said secondary gaming controller to a secondary accounting system but not said casino accounting system, over a second communication link between said secondary gaming controller and said secondary accounting system.

12. The method in accordance with claim 11 wherein said first communication link comprises a first gaming machine interface and said second communication link comprises a second gaming machine interface.

13. The method in accordance with claim 11 further comprising the step of monitoring information regarding said primary credit balance using said secondary controller and additionally transmitting said monitored information to said secondary accounting system.

14. The method in accordance with claim 13 wherein said step of monitoring comprises intercepting information transmitted by said master gaming controller to one or more primary gaming machine meters.

15. The method in accordance with claim 11 wherein said information regarding said primary credit balance comprises information regarding a number of primary game credits credited to said gaming machine as a result of a player providing funds to said gaming machine via said credit accepting device.

16. The method in accordance with claim 11 wherein said information regarding said primary credit balance comprises information regarding a player cashing out one or more of said primary game credits comprising said primary credit balance.

17. The method in accordance with claim 11 further comprising the step of reconciling accounting at said gaming machine utilizing both said information regarding a number of primary game credits and said information regarding a number of secondary game credits.

* * * * *